United States Patent
Danilak et al.

(10) Patent No.: US 9,823,872 B2
(45) Date of Patent: Nov. 21, 2017

(54) APPARATUS AND METHOD FOR TRANSLATION FROM MULTI-DIMENSIONAL TO LINEAR ADDRESS SPACE IN STORAGE

(71) Applicant: Skyera, LLC, San Jose, CA (US)

(72) Inventors: Radoslav Danilak, Cupertino, CA (US); Ladislav Steffko, San Ramon, CA (US); Qi Wu, San Jose, CA (US)

(73) Assignee: Skyera, LLC, San Jose, CA (US)

( * ) Notice: Subject to any disclaimer, the term of this patent is extended or adjusted under 35 U.S.C. 154(b) by 579 days.

(21) Appl. No.: 14/090,960

(22) Filed: Nov. 26, 2013

(65) Prior Publication Data

US 2014/0281312 A1    Sep. 18, 2014

Related U.S. Application Data

(60) Provisional application No. 61/794,647, filed on Mar. 15, 2013, provisional application No. 61/788,613, (Continued)

(51) Int. Cl.
*G06F 12/00* (2006.01)
*G06F 3/06* (2006.01)
(Continued)

(52) U.S. Cl.
CPC .......... *G06F 3/0638* (2013.01); *G06F 3/0604* (2013.01); *G06F 3/065* (2013.01); *G06F 3/0619* (2013.01); *G06F 3/0631* (2013.01); *G06F 3/0641* (2013.01); *G06F 3/0683* (2013.01); *G06F 3/0689* (2013.01); *G06F 12/10* (2013.01); *G06F 12/1027* (2013.01); (Continued)

(58) Field of Classification Search
CPC ............... G06F 3/0638; G06F 12/1018; G06F 2212/7201; G06F 17/3033; G06F 17/30327; G06F 17/30336
See application file for complete search history.

(56) References Cited

U.S. PATENT DOCUMENTS 6,421,662 B1    7/2002  Karten
7,827,218 B1   11/2010  Mittal
(Continued)

OTHER PUBLICATIONS

International Search Report for PCT Application No. PCT/US2014/028864, dated Aug. 13, 2014 (3 pages).

*Primary Examiner* — David X Yi
*Assistant Examiner* — Alan Otto
(74) *Attorney, Agent, or Firm* — McDermott Will & Emery LLP

(57) ABSTRACT

A translation system can translate a storage request having multiple fields to a physical address using the fields as keys to traverse a map. By using a map table, multiple storage services can be condensed into a single map traversal. The map can be made of nodes that include one or more node entries. The node entries can be stored in a hashed storage area or sorted storage area of a node. A node entry of root nodes or inner nodes can include a link to a next node. A node entry of a leaf node can include a physical address. Using the request fields as a key to a node, a node entry can be determined. A pointer in a root node entry or inner node entry can be followed to a next node. A physical address in a leaf node can be the translation of the storage request.

26 Claims, 19 Drawing Sheets

Related U.S. Application Data filed on Mar. 15, 2013, provisional application No. 61/793,141, filed on Mar. 15, 2013, provisional application No. 61/793,591, filed on Mar. 15, 2013, provisional application No. 61/799,023, filed on Mar. 15, 2013, provisional application No. 61/798,754, filed on Mar. 15, 2013.

(51) Int. Cl.

| | | |
|---|---|---|
| *G06F 17/30* | (2006.01) | |
| *G06F 12/10* | (2016.01) | |
| *G06F 12/1027* | (2016.01) | |
| *G06F 12/1018* | (2016.01) | |
| *G06F 12/02* | (2006.01) | |

(52) U.S. Cl.
CPC .. *G06F 17/30292* (2013.01); *G06F 17/30327* (2013.01); *G06F 17/30336* (2013.01); *G06F 12/0238* (2013.01); *G06F 12/0292* (2013.01); *G06F 12/1018* (2013.01); *G06F 2212/7201* (2013.01); *Y02B 60/1225* (2013.01)

(56) References Cited

U.S. PATENT DOCUMENTS

| | | |
|---|---|---|
| 8,381,022 B2 | 2/2013 | Helman et al. |
| 8,504,529 B1 | 8/2013 | Zheng et al. |
| 2004/0098424 A1 | 5/2004 | Seidenberg et al. |
| 2006/0004715 A1 | 1/2006 | Lock et al. |
| 2007/0038656 A1 | 2/2007 | Black |
| 2008/0151724 A1 | 6/2008 | Anderson et al. |
| 2010/0153617 A1 | 6/2010 | Miroshnichenko et al. |
| 2010/0223308 A1 | 9/2010 | Sinclair |
| 2010/0306222 A1* | 12/2010 | Freedman ......... G06F 17/30949 707/759 |
| 2010/0318498 A1 | 12/2010 | Swarnakar |
| 2011/0072198 A1 | 3/2011 | Reiter et al. |
| 2012/0109958 A1 | 5/2012 | Thakur et al. |
| 2012/0130949 A1 | 5/2012 | Picken et al. |
| 2012/0173822 A1 | 7/2012 | Testardi et al. |
| 2012/0323859 A1 | 12/2012 | Yasa et al. |
| 2013/0042052 A1* | 2/2013 | Colgrove .............. G06F 3/0608 711/103 |
| 2013/0339411 A1 | 12/2013 | Bogosian |
| 2013/0346725 A1 | 12/2013 | Lomet et al. |
| 2014/0229482 A1 | 8/2014 | Milenova et al. |

\* cited by examiner

US 9,823,872 B2

APPARATUS AND METHOD FOR TRANSLATION FROM MULTI-DIMENSIONAL TO LINEAR ADDRESS SPACE IN STORAGE

CROSS-REFERENCES TO RELATED APPLICATIONS

This application claims the benefit of and incorporates by reference for all purposes the full disclosure of the following patent applications in their entirety:

U.S. Provisional Patent Application No. 61/794,647, filed Mar. 15, 2013 titled "APPARATUS AND METHOD FOR TRANSLATION FROM MULTI-DIMENSIONAL TO LINEAR ADDRESS SPACE IN STORAGE,"

U.S. Provisional Patent Application No. 61/798,754, filed Mar. 15, 2013 titled "HIGH DENSITY SERVER STORAGE UNIT,"

U.S. Provisional Patent Application No. 61/788,613, filed Mar. 15, 2013 titled "COMPRESSOR RESOURCES FOR HIGH DENSITY STORAGE UNITS,"

U.S. Provisional Patent Application No. 61/793,141, filed Mar. 15, 2013 titled "MASS STORAGE DEVICE AND METHOD OF OPERATING THE SAME TO BACK UP DATA STORED IN VOLATILE MEMORY,"

U.S. Provisional Patent Application No. 61/793,591, filed Mar. 15, 2013 titled "MASS STORAGE DEVICE AND METHOD OF OPERATING THE SAME TO STORE PARITY DATA," and U.S. Provisional Patent Application No. 61/799,023, filed Mar. 15, 2013 titled "VERTICALLY INTEGRATED STORAGE."

The following patent applications, concurrently filed with the present application, are incorporated herein by reference in their entirety:

U.S. patent application Ser. No. 14/091,053, titled "APPARATUS AND METHOD FOR REFERENCING DENSE AND SPARSE INFORMATION IN MULTI-DIMENSIONAL TO LINEAR ADDRESS SPACE TRANSLATION".

U.S. patent application Ser. No. 14/093,131 titled "APPARATUS AND METHOD OR USING FIELDS IN N-SPACE TRANSLATION OF STORAGE REQUESTS".

U.S. patent application Ser. No. 14/091,176, titled, "APPARATUS AND METHOD FOR INSERTION AND DELETION IN MULTI-DIMENSIONAL TO LINEAR ADDRESS SPACE TRANSLATION".

U.S. patent application Ser. No. 14/091,211, titled "APPARATUS AND METHOD FOR CLONING AND SNAPSHOTTING IN MULTI-DIMFNSIONAL TO LINEAR ADDRESS SPACE TRANSLATION".

BACKGROUND

Aspects of the disclosure relate to computing and communication technologies. In particular, aspects of the disclosure relate to systems, methods, apparatuses, and computer-readable media for improving performance of storage devices.

Storage devices for enterprise systems require massive storage capacity. Additionally, storage solutions for enterprise systems require sophisticated storage techniques for reliability, robustness, fault tolerance, maximizing storage capacity, minimizing power consumption, and reducing latency. Various storage industry players have specialized in aspects of these storage techniques in a segmented manner providing piecemeal solutions. Combining of these various segmented solutions results into a clunky storage solution results in a solution that is less than the sum of its parts and significantly underperforms across the board. The segmentation and underperformance of the available solutions today results in a significant deterrent in adaptation of newer storage technologies, such as solid state devices.

BRIEF SUMMARY

Certain embodiments of the present invention relate to translating a storage request having multiple fields to a physical address using the fields as keys to traverse a map table. By using a map table, multiple storage services can be condensed into a single map traversal. A map can be constructed of root nodes, inner nodes and leaf nodes. The root nodes, inner nodes and leaf nodes can include entries that can be indexed or sorted by a field or part of a field. The entries of root nodes and inner nodes can also include pointers to a next node. Leaf node entries can include values, such as a physical address and/or other attributes (e.g. ECC values, etc.). When traversing the storage map, the translation system can start at a root node. Using one or more fields from the request, the translation system can determine entries in the root node and/or inner nodes that have a pointer to a next node. The pointers in the determined entries can be followed until a leaf node is found. Using one or more fields from the request or portions thereof, an entry in the leaf node can be determined. The values stored in the determined leaf node can then be returned, such as the physical address and/or other attributes. For example, a read storage request of logical unit number (LUN), logical block address (LBA) and snapshot number (SNAP) (i.e. Read (LUN, LBA, SNAP)) can be processed by traversing a storage map to return a physical address and a length attribute of 240 (i.e. return(PA, L)).

A closest match algorithm can be used to retrieve unchanged data belonging to a prior generation of data. For example, when a snapshot is created, a snapshot number can be incremented. In the embodiment, changes are not needed to the underlying snapshot data. When searching for the new snapshot, the process of selecting a LUN and following pointers within the inner nodes can be performed as described above. However, the new snapshot can be devoid of any data. In the this case of a snapshot that does not have new data at the location requested, the translation system can select an entry that has the same LUN and LBA, but has a closest earlier snapshot entry. This embodiment of snapshotting allows for the deduplication of information over multiple generations of snapshots. This embodiment of snapshotting can provide a fast method of taking a snapshot, while preventing a loss of time due to copying.

The storage map can also be optimized for dense and sparse information. An entry in a node can be stored in a hashed storage area of a node or a sorted area of a node. In the hashed storage area, a key (e.g. a field of a storage request) can be used to calcuate an index into the hashed storage area. A hashed storage area, in some embodiments, does not store the key. The hashed storage area can service dense key ranges, where keys are more bunched together than spread out. The hashed area can provide a a constant lookup time. In the sorted area of a node, a key can be used to search the sorted area for a matching entry. In some embodiments, the entries are linearly sorted and a binary search is used to determine the location of an entry having a matching key. A sorted storage area, in some embodiments, stores the key to allow for the comparison of keys during the search. The sorted storage area can service sparse key ranges, where keys are more spread out than bunched together. The sorted storage area can provide a compact space for storage of sparse keys. Storage maps and/or individual nodes can be of multiple types including only hashed, only sorted or a hybrid of both.

BRIEF DESCRIPTION OF THE DRAWINGS

Aspects of the disclosure are illustrated by way of example. In the accompanying figures, like reference numbers indicate similar elements, and.

DETAILED DESCRIPTION

Figure 1:
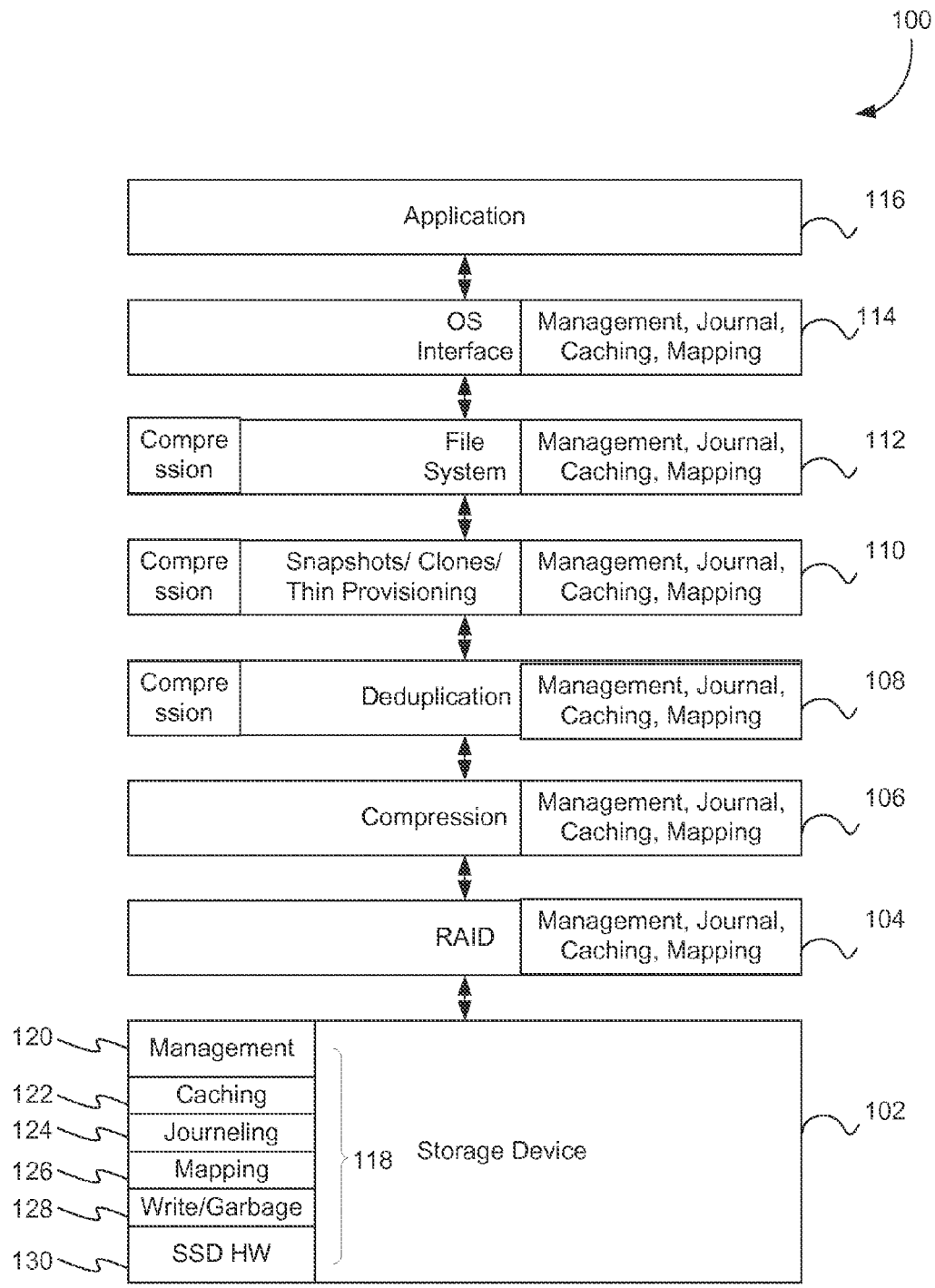
FIG. 1 shows a simplified diagram of a layered approach for accessing storage hardware in accordance with at least one embodiment.

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

Certain embodiments of the present invention relate to translating a storage request having multiple fields to a physical address using the fields as keys to traverse a map table. By using a map table, multiple storage services can be condensed into a single map traversal. A map can be constructed of root nodes, inner nodes and leaf nodes. The root nodes, inner nodes and leaf nodes can include entries that can be indexed or sorted by a field or part of a field. The entries of root nodes and inner nodes can also include pointers to a next node. Leaf node entries can include values, such as a physical address and/or other attributes (e.g. ECC values, etc.). When traversing the storage map, the translation system can start at a root node. Using one or more fields from the request, the translation system can determine entries in the root node and/or inner nodes that have a pointer to a next node. The pointers in the determined entries can be followed until a leaf node is found. Using one or more fields from the request or portions thereof, an entry in the leaf node can be determined. The values stored in the determined leaf node can then be returned, such as the physical address and/or other attributes.

For example, a read storage request of logical unit number, logical block address and snapshot number (i.e. Read (LUN, LBA, SNAPSHOT)) can be processed by traversing a storage map to return a physical address and a length attribute of 240 (i.e. return(PA, L)). In this example, a root node is sorted by LUN; two inner nodes are sorted by LBA and a leaf node is sorted by snapshot. After receiving the read request, a translation system can start at the root node. The translation system can then select the entry for the LUN and follow a pointer to a first inner node. The header of the first inner node can contain instructions for the translation system to compute a key for an entry in the first inner node through use of a modulus of a first portion of the LBA. The selected entry of the first inner node can contain a pointer to a second inner node. The pointer can then be followed to a second inner node. The header of the second inner node can contain instructions for the translation system to compute a key to a second entry in the second inner node by using a modulus of a second portion of the LBA. The second entry can contain a pointer to a leaf node. After following the second entry to the leaf node, the translation system can be instructed to find the snapshot. Using the key described in the header of the leaf node, the snapshot number is used to find the key in the leaf node. Once the key is found in a leaf entry, the corresponding PA and L values can be retrieved from the leaf entry and returned.

A closest match algorithm can be used to retrieve unchanged data belonging to a prior generation of data. For example, when a snapshot is created, a snapshot number can be incremented. In the embodiment, changes are not needed to the underlying snapshot data. When searching for the new snapshot, the process of selecting a LUN and following pointers within the inner nodes can be performed as described above. However, the new snapshot can be devoid of any data. In the this case of a snapshot that does not have new data at the location requested, the translation system can select an entry that has the same LUN and LBA, but has a closest earlier snapshot entry. This embodiment of snapshotting allows for the deduplication of information over multiple generations of snapshots. This embodiment of snapshotting also provides a fast method of taking a snapshot, while preventing a loss of time due to copying.

When data is written to the new snapshot, the new data can be stored in a new entry. When data in the snapshot is overwritten, the data can be traced to a leaf node. An entry with new snapshot number and the old LUN and LBA data can be created in the leaf node. This method of storage allows the translation system to traverse the storage map to find a LUN, LBA and snapshot value, but use a closest snapshot value if an exact snapshot value cannot be found.

The storage map can also be optimized for dense and sparse information. An entry in a node can be stored in a hashed storage area of a node or a sorted area of a node. In the hashed storage area, a key (e.g. a field of a storage request) can be used to calcuate an index into the hashed storage area. A hashed storage area, in some embodiments, does not store the key. The hashed storage area can service dense key ranges, where keys are more bunched together than spread out. In the sorted area of a node, a key can be used to search the sorted area for a matching entry. In some embodiments, the entries are linearly sorted and a binary search is used to determine the location of an entry having a matching key. A sorted storage area, in some embodiments, stores the key to allow for the comparison of keys during the search. The sorted storage area can service sparse key ranges, where keys are more spread out than bunched together. The sorted storage area can provide a compact space for storage of sparse keys. Storage maps and/or individual nodes can be only hashed, only sorted or a hybrid of both.

FIG. 1 illustrates a simplified diagram of a layered approach for accessing storage hardware. The layered approach for storage devices uses a number of stacked software/firmware layers for accessing the storage hardware from the application layer 116. As shown in FIG. 1, In one implementation, the layered approach includes the firmware associated with the storage device 118, Redundant Array of Independent Disks (RAID) layer 104, compression layer 106, deduplication layer 108, snapshots/clones/thin provisioning layer 110, file system layer 112, OS interface layer 114, and application layer 116. The firmware interacting with the hardware may also act as another layer 102 implementing its own management 120, caching 122, journaling 124, mapping 126, and write/garbage collection 128. The various layers in the stack may be developed by various storage device industry vendors.

The RAID software/firmware layer 104 provides fault tolerance by spreading the data and parity information across multiple disks or planes. The compression layer 106 compresses data allowing for efficient and faster access of storage medium. The deduplication layer 108 generally generates fingerprints using hash functions for each command that a host issues to the storage device. The deduplication layer 108 detects duplication by comparing the current generated fingerprint with the maintained ones. In one implementation, the deduplication layer 108 maps the duplicate blocks from the various linear addresses to the same physical address, reducing the number of writes to storage and using the storage space more efficiently. The file system layer 112 provides abstraction for storing, retrieving and updating files on the storage device. Additionally, the file system manages access to data and metadata of the files and available space on the device. The OS interface layer 114 provides the application layer 116 a standardized interface for interacting with the storage device by calling function calls enabled by the OS interface layer 114.

In addition to their primary roles discussed above, most of the layers of the storage stack also perform additional house-keeping routines, such as maintaining memory, management functions, caching, linear to physical address mapping, garbage collection and journaling of states for protection against catastrophic events. Garbage collection may refer to the releasing of memory/storage resources no longer needed by the layer. Journaling may refer to logging state before committing the state in state machine. In the event of a catastrophic event, such as a system crash or a power failure, journaling may enable the system to recover faster and avoid corruption of system state.

Many of these house-keeping routines are duplicated in each layer of the storage stack, since these house-keeping routines performed by each layer are dedicated to that specific layer and isolated from the other layers because of the layered architecture causing significant memory, processing and performance overhead.

Furthermore, for an application from the application layer 116 to communicate with the storage device 102, the message must pass through seven layers as shown in FIG. 1. The passing of the data message through multiple layers requires a number of encapsulation and de-encapsulation steps that also generates significant overhead.

The interface between each layer also creates bottlenecks. Moreover, the interface abstracts away details and allows for only limited visibility to the next layer below and beyond requiring duplication of functions in the software stack, such as compression and journaling of state. For example, the file system layer 112, the Snapshots/clones thin provisioning layer 110 and the deduplication layer may all implement compression algorithms. However, once data is compressed there is very little benefit in repeatedly compressing data, resulting in wasted resources, in terms of latency and performance. Therefore, duplication of functions results in processing and memory overhead considerably dragging down the performance of the system.

Each layer also manages its own mapping to translate the message from one layer to another. Mapping operations are expensive operations, increasing latency of data operations and degrading the performance of the system even further.

Moreover, the storage stack layers are developed by different vendors and adhere to various standard bodies. Every layer is developed in isolation from the other layers in the storage stack software vastly repeating the same functionality in different manifestations significantly increasing the probability of bugs in the system. Additionally, the storage stack layered approach hampers innovation in the product line, since any innovation that disturbs the interfaces between the different layers goes through a complex negotiation process with the various stake holders, such as the vendors for the different layers in the software stack. Furthermore, the performance degradation has a multiplicative in the layered architecture further exasperating performance issues.

Figure 2:
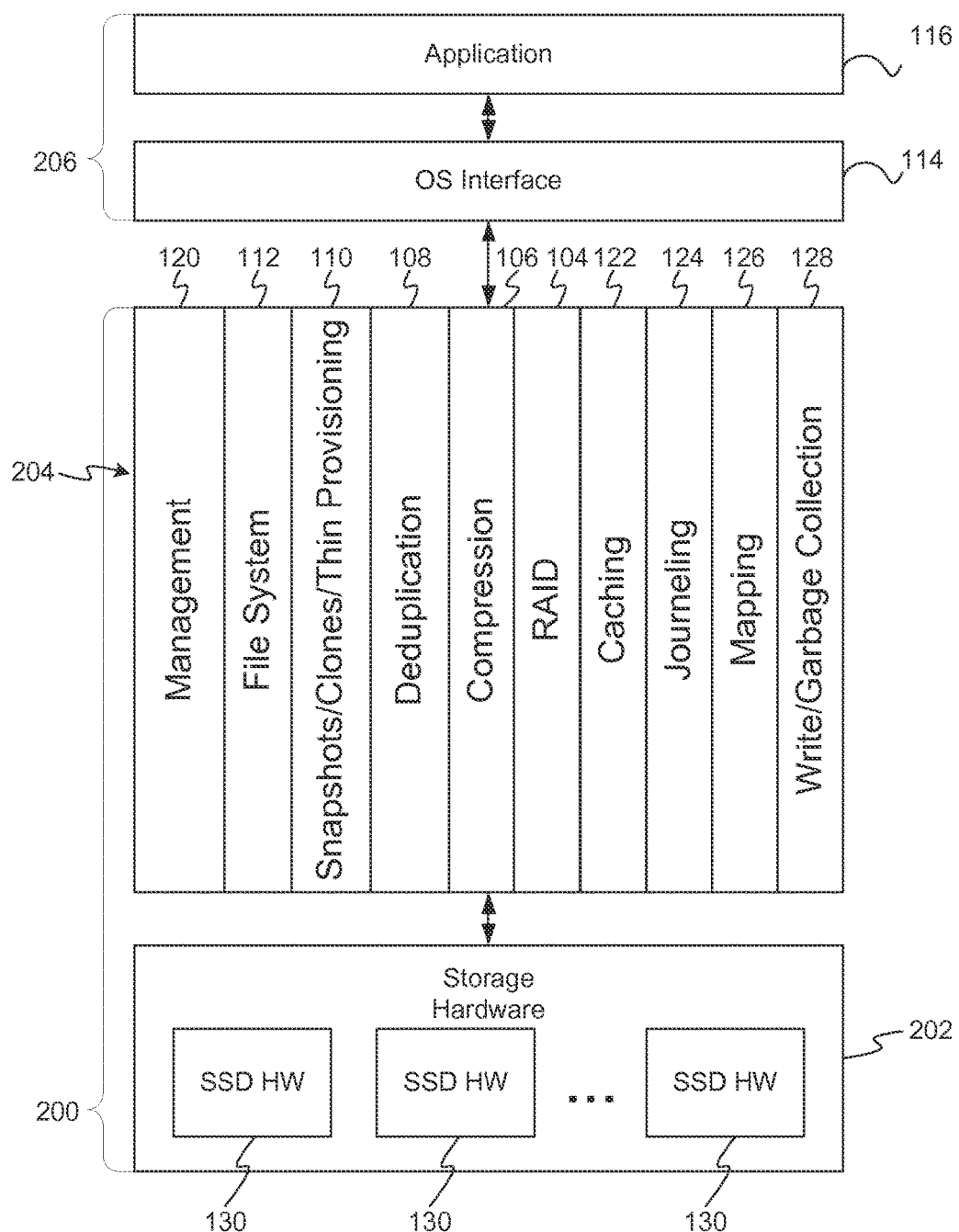
FIG. 2 shows a simplified diagram of a vertically integrated approach for accessing storage hardware in accordance with at least one embodiment.

The many repeated tasks and functions shown in FIG. 1 can be condensed into a storage system that can reduce the redundancy shown in FIG. 1. FIG. 2 illustrates a simplified diagram of a vertically integrated approach for accessing storage hardware. A client 206 that includes an application 116 and operating system interface 114 can access a storage system 200. The storage system 200 can include a management system 204 for managing storage hardware 202 that can include solid state drive hardware 130. The management system can be configured to provide a Redundant Array of Independent Disks (RAID) layer 104, compression layer 106, deduplication layer 108, Snapshots/clones/thin provisioning layer 110 and file system layer 112. Vertically integrating the various functionalities of the multiple layers into a single layer can increase the reliability, robustness and fault tolerance functions and can improve storage capacity, power consumption, and latency of the overall system. For example, solid state drive hot spots can be reduced. As the management system 204 can map across all of the solid state drives using physical addressing, usage can be spread over the devices.

Client 206 can interact with the storage system 200 using storage requests that include fields that address layers 104, 106, 108, 110, 112, 120, 122, 124, 126 and/or 128. Depending on the embodiment, client 206 can issue a file system storage request, block storage request, object storage request, database storage request or structured storage request. These requests can be translated from a set of request fields to a set of return values. The request fields can address one or more layers 104, 106, 108, 110, 112, 120, 122, 124, 126 and/or 128. In some embodiments, the fields can be addressed implicitly, such as through prior settings. For example, a RAID stripe can be implicated because the read request occurs over several storage devices due to the RAID setup. Other layers 104, 106, 108, 110, 112, 120, 122, 124, 126 and/or 128 can be directly addressed or managed.

For example, client 206 can create a read block storage request that provide fields relating to file system layer 112, snapshot/clone layer 110, and mapping 126 layer. The request includes fields requesting a storage node (NODE), logical unit number (LUN), snapshot number (SNAP), clone number (CLONE) and logical block address (LBA), which can be written as Read(NODE, LUN, SNAP, CLONE, LBA). The client 206 can send the read block storage request to the management system 204. The management system 204 can translate the read block storage request into a physical address and/or attributes (e.g. ECC, etc.). The management system 204 can then request the data from the storage hardware 202 using the physical address and/or other attributes. The storage hardware 202 can address the individual solid state drive hardware 130 and return the data to the management system 204. The management system 204 can return the data to the client 206. Other request types can be used such as update, delete, clone, snapshot, etc. For example, a file system update request can include fields of NODE, storage volume (VOL), file system (FILESYS), file identifier (FILEID), stream (STREAM), SNAP, CLONE and LBA and data to store (DATA), which can be written as Update(NODE, VOL, FILESYS, FILEID, STREAM, SNAP, CLONE, LBA, DATA).

Figure 3:
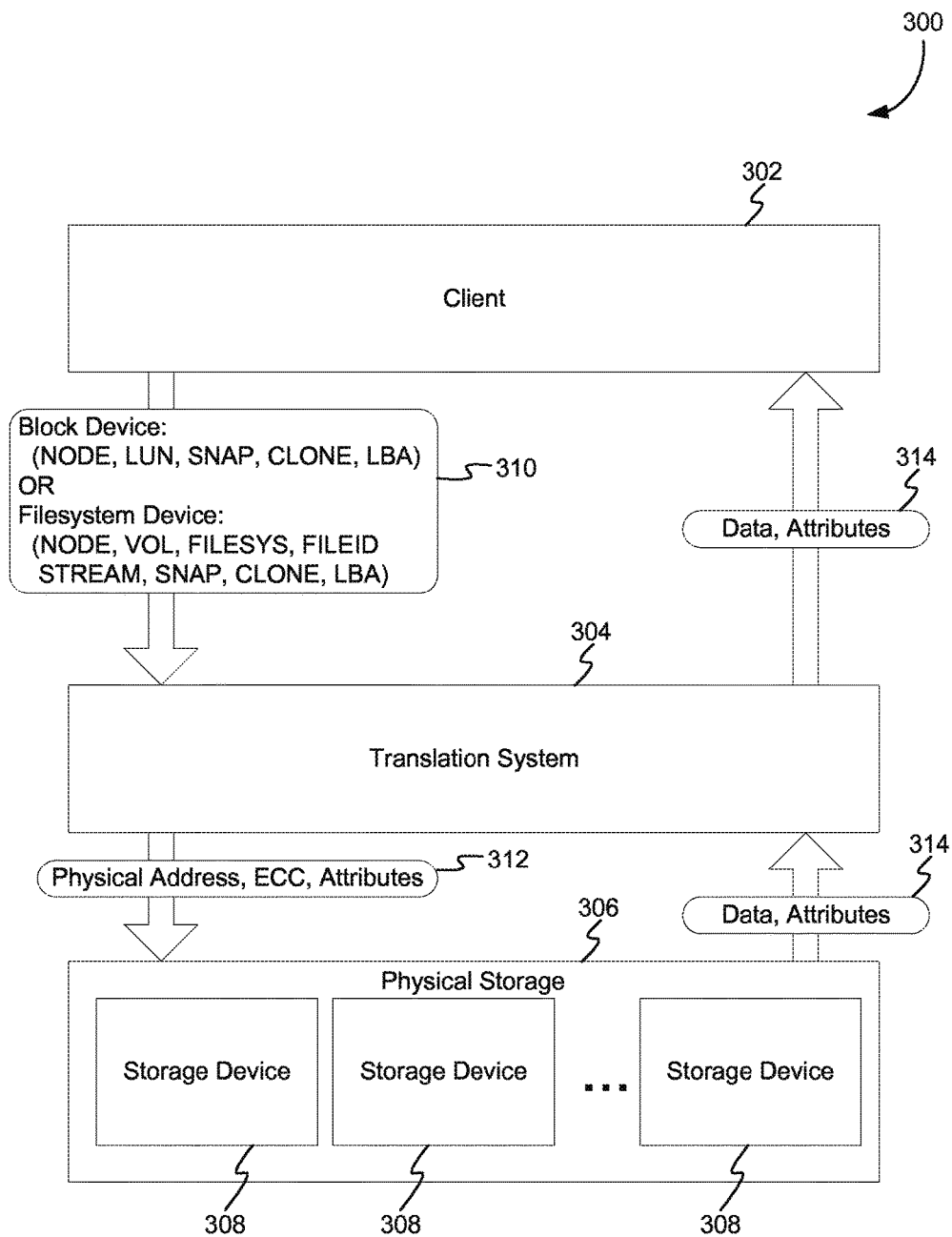
FIG. 3 shows an illustrative example of a system for translating storage requests into physical addresses in accordance with at least one embodiment.

When operating as upon requests from client 206, management system 204 can be viewed as a translation system between client requests and storage hardware 202. FIG. 3 shows this abstraction of a system for translating storage requests into physical addresses in accordance with at least one embodiment. Client 206 can be similar or the same as client 302. Management system 204 can be similar or the same as translation system 304. Storage hardware 306 can be similar or the same as physical storage 306. Solid state drive hardware 130 can be similar or the same as storage device 308. Client 302, translation system 304 and physical storage can be integrated into one enclosure, be spread across multiple computing resources or a combination thereof.

Client 302 can make logical storage requests 310 that are translated by translation system 304 into physical storage requests 312 that are used to provide return data 314 from physical storage 306. Client 302 can create logical storage request 310 that includes one or more fields that identify logical constructs supported by translation system 304. Translation system 304 can use the fields in the request to determine a translation from logical storage request 310 to physical storage request 312. The translation can result in a value and/or attributes that can be used to create physical storage request 312. Physical storage request 312 can be sent to physical storage 306 to retrieve return data 314 from one or more storage devices 308 (where the ellipsis in FIG. 3 shows that more than 3 storage devices may be used). The translation system 304 can then provide the return data 314 to the client 302. In some embodiments, the return data 314 from physical storage 306 can be modified by the translation system 304 to meet response requirements of the client 302. In one embodiment, the translation system 304 can be compatible with an operating system (e.g. OS Interface 114 in FIG. 1) such that it operates as a drop-in replacement for individual storage layers (layer 104, 106, 108, 110, 112, 114 and 116 in FIG. 1).

In one example, the translation system 304 causes the physical storage 306 to appear as a block device. A block device request, such as Read(NODE, LUN, SNAP, CLONE, LBA) can be sent to translation system 304. The translation system 304 can use the fields of NODE, LUN, SNAP, CLONE and LBA to determine a physical storage request 312, such as Read(Physical Address, ECC, Length). In response to the physical storage request 312, one or more storage devices 308 can retrieve data from storage and provide return data 314 to the translation system 304. The translation system 304 can provide return data 314 to the client 302. The translation system 304 can format and/or manipulate the data to satisfy client 302 requirements.

Figure 4:
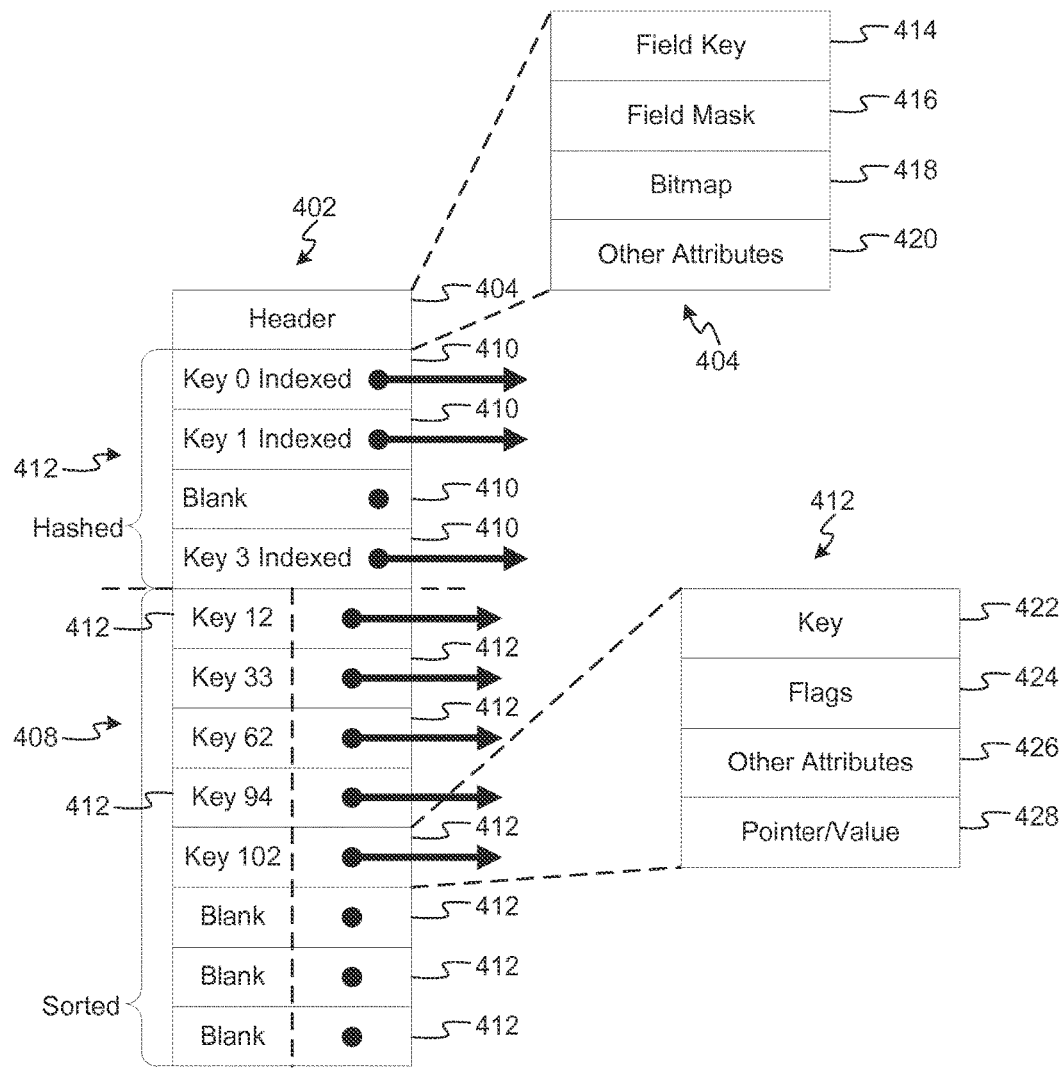
FIG. 4 shows a diagram of a node structure for translating storage requests into physical addresses in accordance with at least one embodiment.

The translation system 304 can include a map data structure that describes the translation from logical storage request 310 into physical storage request 312. The map structure can be traversed from root node to a leaf node based on the fields provided in the request. FIG. 4 shows an example of node 402 and its structure that can be used to translate field information into a node entry 410 or 412 that results in a next node pointer or a physical address.

A map structure for translating from logical storage request 310 (e.g. logical storage request 310 from FIG. 3) into physical storage request 312 can include multiple nodes 402, including a root node, inner node and leaf node. A map traversal can start at a root node, travel through zero or more inner nodes and stop when a leaf node is reached. At each node, a decision of which node is next can be made based on one or more field values or parts thereof from logical storage request using header information 404 in the node. When a leaf node is reached, a physical address can be determined along with other attributes. The physical address can then be used to complete the logical storage request by performing an operation to satisfy the logical storage request 310 at the physical address (e.g. a read operation, update operation, delete operation, etc.).

A node 402 can describe a step in the translation from a logical storage request 310 (e.g. logical storage request 310 from FIG. 3) into physical storage request 312. A node can comprise a header 402, a hashed storage area 412, hashed entries 410, sorted storage area 408 and sorted entries 412. A header 402 can contain metadata that describes the structure and access of data within the node. For example, the header 402 can contain a field key identifier 414 that indicates which field is used as a key in the node, a field mask 416 indicating which bits of the field identifier are to be used in matching the key or computing an index, a bitmap 418 indicating which data must be retrieved from a previous clone and other attributes 420 as needed, such as an indication of which values are stored in the hashed storage area and sorted storage area.

Entries 410 and 412 can be organized by a key defined in the header 402 and store a pointer to a next node (in the case of a root or inner node) as shown or value (in the case of a leaf node) (not shown). In some embodiments, hashed entries 401 do not include a key in the entry because the entries are indexed by the key. The sorted entries 412 can include a key section to aid in comparison during search of the sorted entries 412. In one embodiment, a sorted entry 412 can include a key 422, flags 424 that can provide exception information (e.g. that a prior snapshot should be used), other attributes 426 and a pointer to a next node 428 (in the case of a root or inner node) as shown or value (in the case of a leaf node) (not shown).

When used by a translation module, a node can be used to step toward a translation of a field provided in the logical storage request to a physical address. For example, a translation module accesses node 402 during a logical storage request where LBA=62. The header 402 indicates that the entire LBA field should be used as the key. The header 404 also indicates that the range of the hashed storage area 412 begins at 0 with four entries, which is not within the range of LBA=62. The header bitmap 418 indicates that the values are within this branch of the map. Using a value of 62 as the key, the entries 412 of the sorted storage area 408 are searched for key equal to 62. The key is found and a pointer 428 is followed to a next node.

The root node, inner node and leaf node can include different information and/or have a different structure. A root node can be a starting node for the traversal of the map. The root node can include information in its header 402 to describe which field(s) or parts thereof can be used to determine a pointer to a next node. A root node can also include extra information not found in other nodes, such as information about a logical storage device, such as a basis in a prior snapshot or clone. An inner node can be linked to from a root node or other inner node. The inner node can also include information in its header 402 to describe which field(s) or parts thereof can be used to determine a pointer to a next node. A leaf node can be linked to by a root node or other inner node.

While the node has been described as having a hybrid structure of with hashed storage area 412 and sorted storage area 408, it should be recognized that individual nodes can be composed of either or both structures. In some embodiments, a map uses only nodes having only one storage type. Sizes of the hashed storage area 412 and sorted storage area 408 can be different and vary from node to node depending on optimizations applied, individual node settings, global node settings and node storage needed.

With some fields, a nearest neighbor can satisfy a request for a specified field. In some embodiments, a snapshot uses nearest neighbor analysis to reduce storage costs of unchanged data over one or more snapshots. For example, a translation module accesses node 402 during a logical storage request where SNAP=90. The header 402 indicates that the entire SNAP field should be used as the key and that nearest previous neighbor analysis should be used (in some embodiments, the nearest neighbor setting is implicit when searching snapshots). The header 404 also indicates that the range of the hashed storage area 412 begins at 0 with four entries, which is not within the range of SNAP=90. The header bitmap 418 indicates that the values are within this branch of the map. Using a value of 90 as the key, the entries 412 of the sorted storage area 408 are searched for key equal to 90. As the search ends with no match, but a key of 62 exists previous to the SNAP value of 90, the SNAP value of 62 can be used. The difference between SNAP values of 90 and 62 can indicate that no change to the logical storage device has occurred since a 62nd snapshot.

Figure 5:
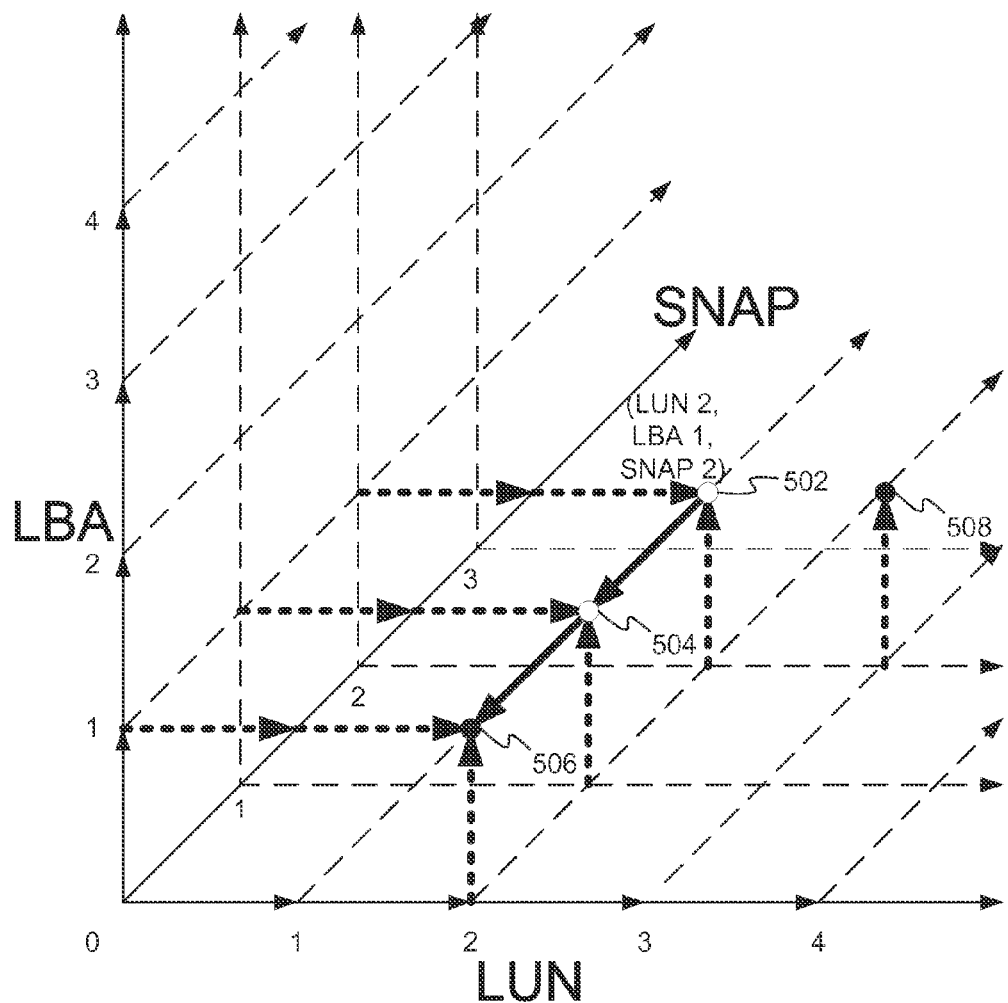
FIG. 5 shows a diagram of translating a storage request into physical addresses using a closest match snapshot in accordance with at least one embodiment.

A representation of the nearest neigbhor analysis can be visualized in three dimensional space as a relationship between unchanged information between snapshots. FIG. 5 shows a diagram of translating a storage request into physical addresses using a closest match snapshot in accordance with at least one embodiment. The x-axis represents a logical unit number. The y-axis represents a logical block address. The z-axis represents a snapshot taken of a data plane on the x and y axis. Solid dot 506 and 508 represent data written during the selected snapshot. Hollow dot 502 and 504 represent data that was not written during the selected snapshot.

A nearest prior neighbor analysis allows a snapshot to share data with prior snapshots. For example, a client (e.g. client 302 from FIG. 3) can provide a request of Read (LUN=2, LBA=1, SNAP=2). The translation system (e.g. translation system 304 from FIG. 3) can traverse the map through nodes that represent LUN=2 and LBA=1. Upon arriving at a node (e.g. node 402 from FIG. 4) that represents SNAP, an entry where SNAP=2 is not found. However, a nearest neighbor entry where SNAP=0 is found. In the embodiment shown, the entry for SNAP=0 can be used because no changes have occurred since SNAP=0 where LUN=2 and LBA=1. This lack of change can be similar or equivalent to the path shown from hollow dot 502 through hollow dot 504 to solid dot 506. As no changes have been made to LUN=2 and LBA=1 since SNAP=0, a path is traced from hollow dot 502 until solid dot 506 is reached indicating new data at 506.

On the other hand, as new data was writted at LUN=2, LBA=1, SNAP=2 as indicated by solid dot 508, an exact match can occur and no tracing back to previous snapshots is required.

FIGS. 6 to 9 show a diagram of an embodiment of a map at a point in time and are used to help describe operations that can be performed on and/or with the map. The operations have been simplified to use LUN, LBA and SNAP in FIGS. 6-8C and LUN, LBA, SNAP with CLONE awareness in FIG. 9. The operations include search, update, delete and search with CLONE awareness. The data structures and processes described can be accomplished with the use of the systems shown in FIG. 3, including client 302, translation system 304 and physical storage 306. The map data structure can be contained in storage in translation system 304 and/or physical storage 306. The operations described can be performed by the translation system 304 in response from a request provided by client 302.

Figure 6:
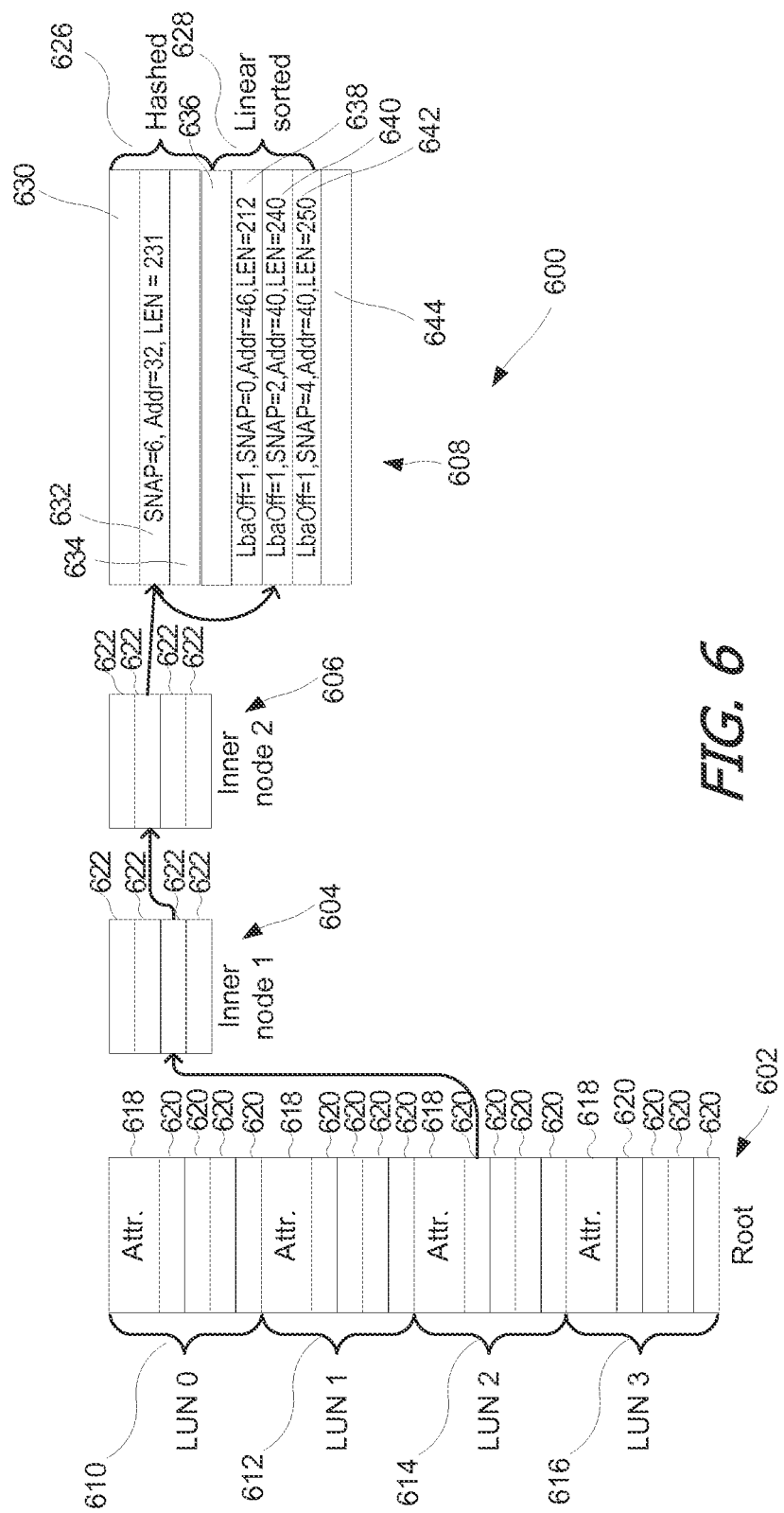
FIG. 6 shows a diagram of a map for translating storage requests into physical addresses in accordance with at least one embodiment.

Many request types from a client (e.g. client 302 in FIG. 3) require a search, such as a read request. FIG. 6 shows a diagram of a map for translating storage requests into physical addresses that can be used in a search. The map contains a root node 602 with root entries 610, 612, 614 and 616. Root node entry 614 contains attributes 618 and one or more other values 620 that include a pointer to inner node 1 604. Inner node 1 includes inner node entries 622, in which one inner node entry 622 points to inner node 2 606. Inner node 2 also contains inner node entries 622, one of which contains a pointer to leaf node 608. Leaf node 608 contains a hashed storage area 626 and linear sorted storage area 628. In the hashed storage area 626, two free hashed entries 630 and 634 exist. Hashed entry 632 contains a key (e.g. SNAP=6, LBA=32, LEN=231) and value. In some embodiments, the LEN value can be used to determine which LBA addresses are covered by the entry (e.g., ADDR=32, LEN=231 covers addresses from 32 to 263 which is 32+231). In the linear sorted storage area 628, two free sorted entries 636 and 644 exist and sorted entries 638, 640 and 642 are found.

In one example, a client may request a Read(LUN=2, LBA=37, SNAP=3) and the translation system can translate the request to a return value of (ADDR=40, LEN=240). After receipt of the client request, the translation system can start the search at root node 602. After reading a header of root node 602, the translation system can determine that the root node is a hashed storage area based on LUN number. Using a hash obtained from the root node header, where hash=LUN, the translation system can access the entry for LUN 2 614. Attributes about LUN 2 can be found in an attribute section of entry 614. The translation system can use a node pointer stored in among values to find the next node, inner node 1 604. Upon arrival at inner node 1 604, the translation system can read the header for inner node 1 604. The header can indicate that inner node 1 is also hash based with the LBA field used using the bits 4-5 of the LBA field (LBA=37 decimal=1_00_101 binary) which are 10 binary or 2 decimal. As there are four entries 622, the value can be modulo 4, which results in 2. Therefore entry 2 622 is accessed in inner node 1 and the corresponding node pointer is followed to inner node 2 606. The header node of inner node 2 can indicate that bits 2-5 of LBA field (1_0010_1 binary) are used to index into the inner node 2 606. As there are four entries 622, the index can be modulo 4 (1001 binary is 9 decimal) the resulting entry 622 at index 1 can be accessed and followed to leaf node 608.

When the translation system accesses the leaf node 608, the header can indicate a search using the LBA offset (LBA=1001_01_ binary). As the request indicates an LBA offset=1 and four entries, 1 modulo 4 is one. Entry 632 can be accessed to determine if it is a match. As entry 632 is not a match, and a snapshot can be used with closest neighbor analysis (as described above, e.g. FIG. 5), the linear sorted storage area 628 can be searched for a nearest neighbor which is entry 640.

Entry 640 provides a return value of (ADDR=40, LEN=240). This return value can then be used to access physical storage using the address and length. The resulting data from physical storage can be returned to the client.

Figure 7A:
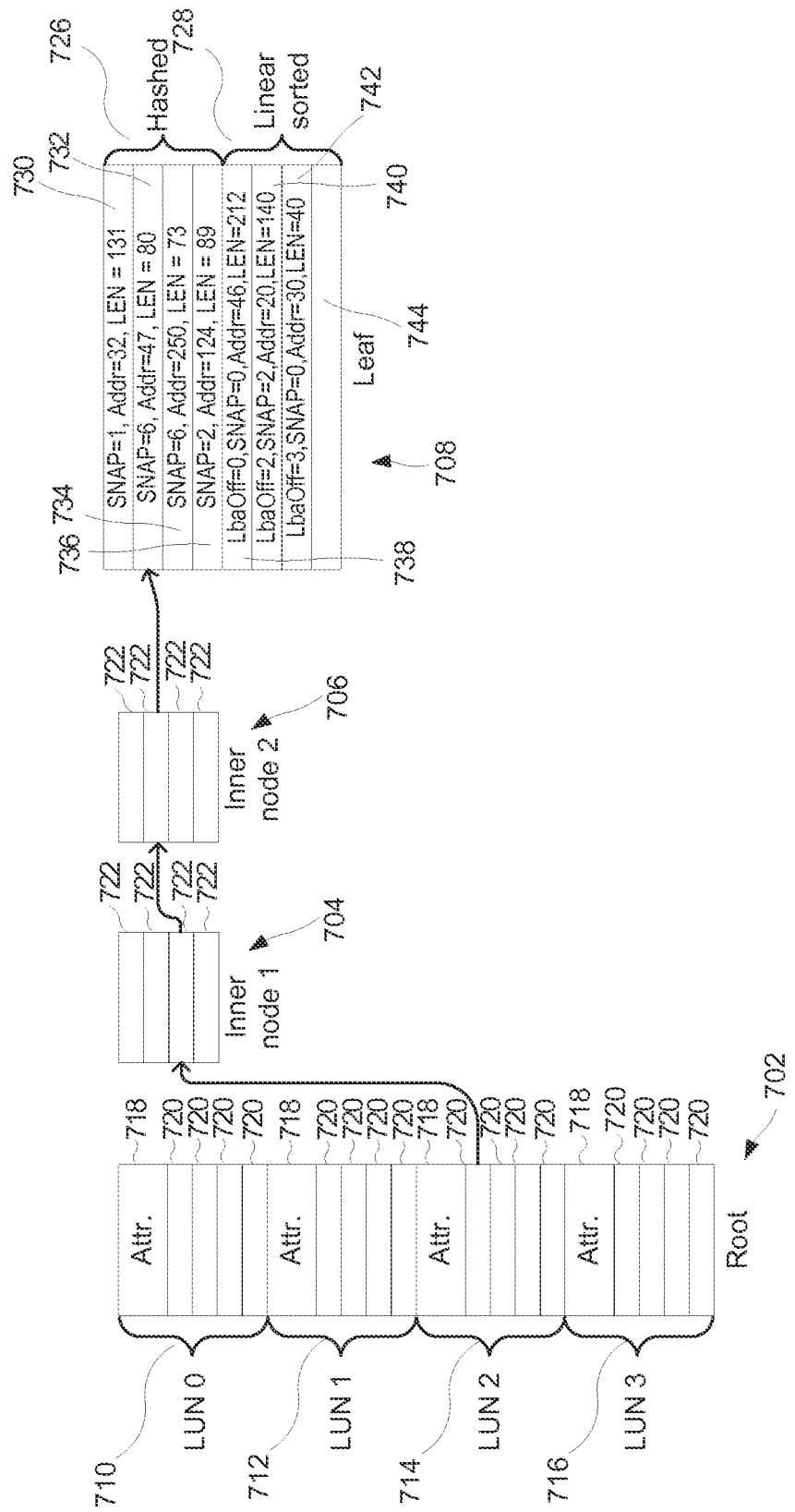
FIG. 7A shows a diagram of a map for translating storage requests into physical addresses in accordance with at least one embodiment.
Figure 7B:
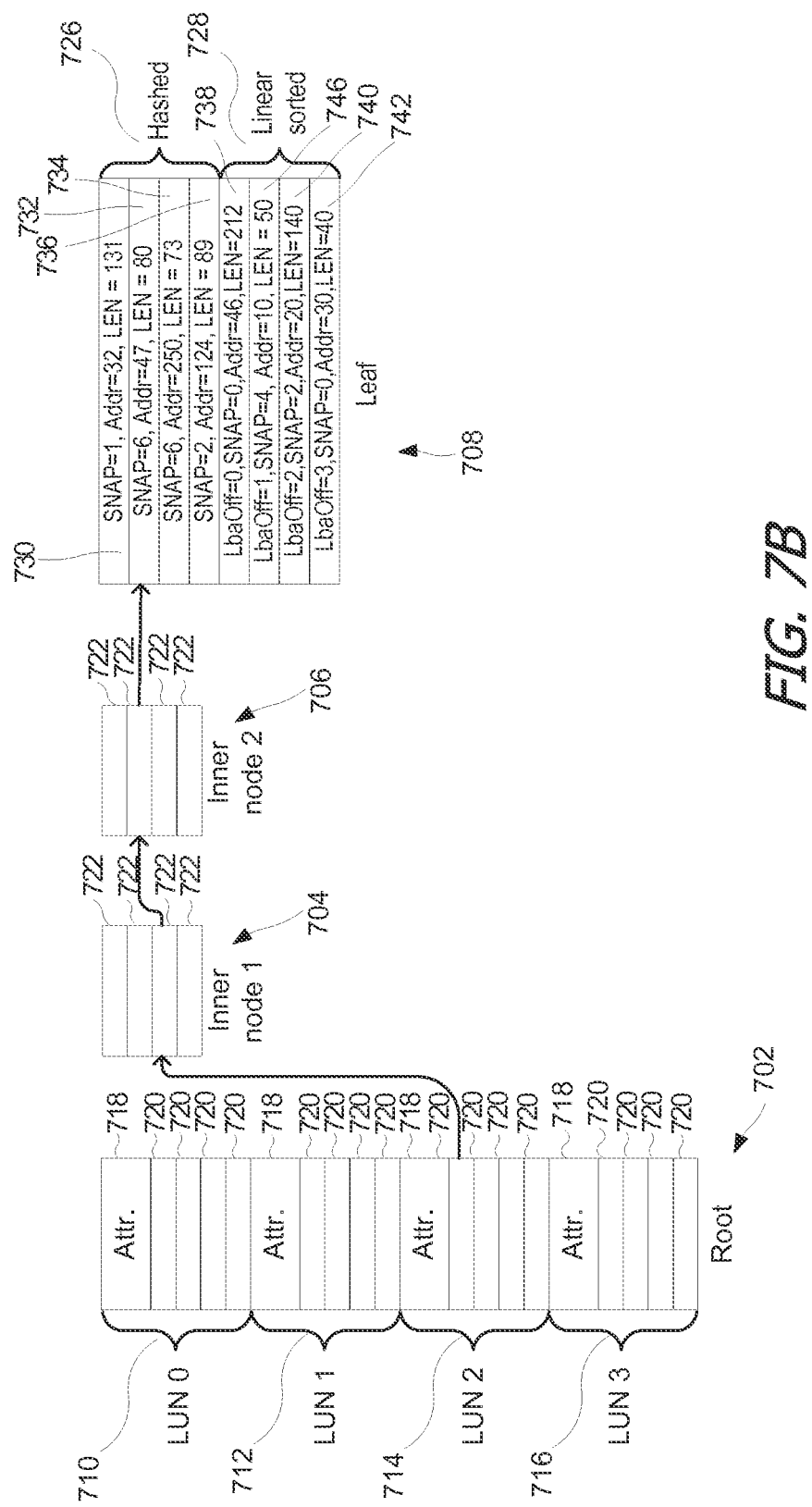
FIG. 7B shows a diagram of a map for translating storage requests into physical addresses after an update in accordance with at least one embodiment.
Figure 7C:
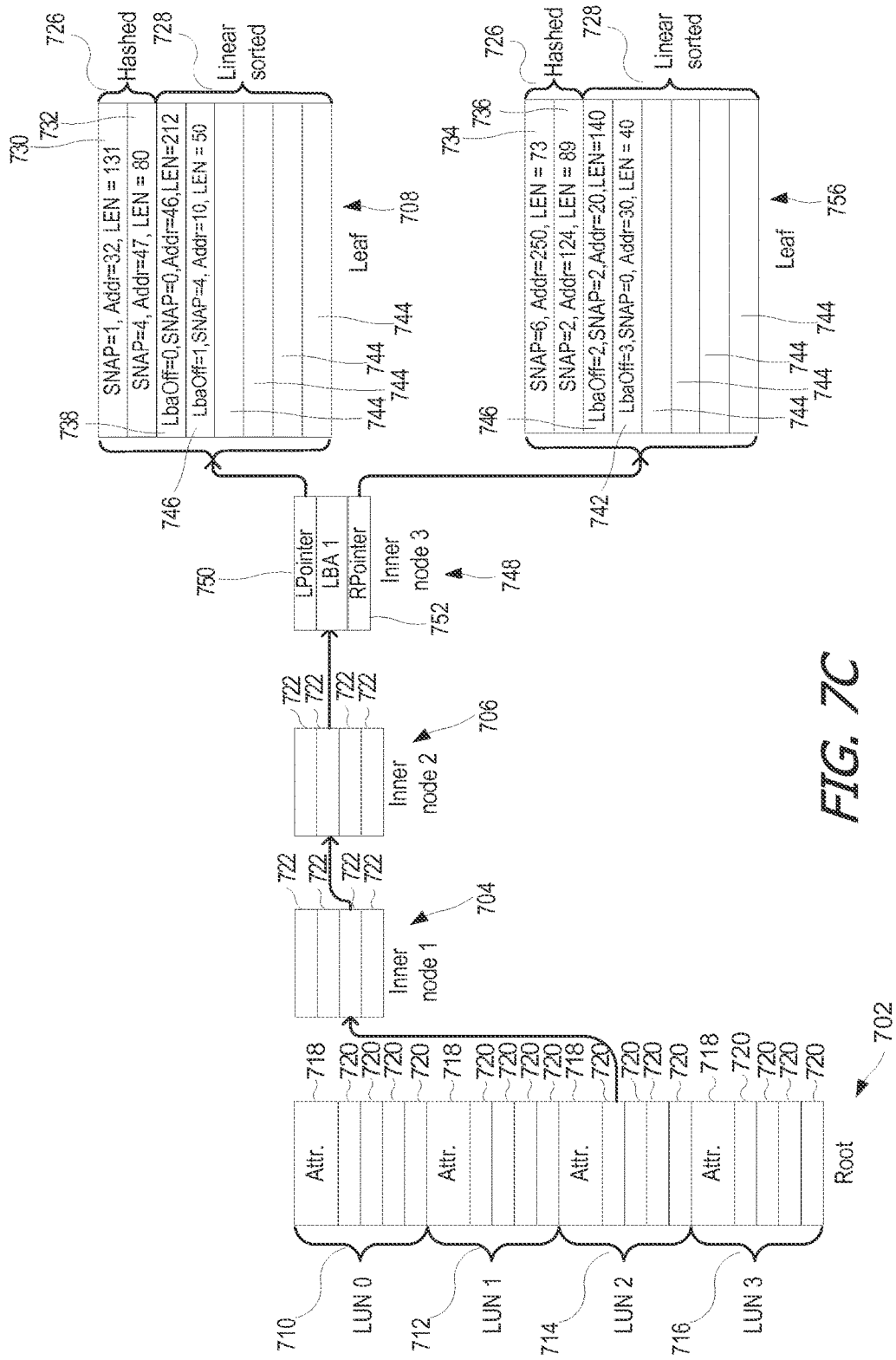
FIG. 7C shows a diagram of a map for translating storage requests into physical addresses after update and split in accordance with at least one embodiment.

An update operation can act as a search operation to determine the correct node for the update and then an update when the node is reached. An update can update an entry if it exists or insert an entry if the entry does not exist. If the entry exists, the entry can be overwritten and no further action is necessary. However, if an insert is necessary, a node can become full and the node can be separated into two parts. The two parts can then be connected to a new parent node which takes the place of the old prior node before splitting. FIG. 7A shows a diagram of a map for translating storage requests into physical addresses before an update. FIG. 7B shows a diagram of a map for translating storage requests into physical addresses after an update. FIG. 7C shows a diagram of a map for translating storage requests into physical addresses after update and full node split.

In FIG. 7A, the map contains a root node 702 with root entries 710, 712, 714 and 716. Root node entry 714 contains attributes 718 and one or more other values 720 that include a pointer to inner node 1 704. Inner node 1 includes inner node entries 722, in which one inner node entry 722 points to inner node 2 706. Inner node 2 also contains inner node entries 722, one of which contains a pointer to leaf node 708. Leaf node 708 contains a hashed storage area 726 and linear sorted storage area 728. In the hashed storage area 726, hashed entries 730, 732, 734 and 736 exist. In the linear sorted storage area 728, hashed entries 738, 740 and 742 exist, while entry 744 is empty.

The client can request an Insert(LUN=2, LBA=37, SNAP=6, Data). After receipt of the client request, the translation system can start the search at root node 702. After reading a header of root node 702, the translation system can determine that the root node is a hashed storage area based on LUN number. Using a hash obtained from the root node header, where hash=LUN, the translation system can access the entry for LUN 2 714. Attributes about LUN 2 can be found in an attribute section of entry 714. The translation system can use a node pointer stored in among values to find the next node, inner node 1 704. Upon arrival at inner node 1 704, the translation system can read the header for inner node 1 704. The header can indicate that inner node 1 is also hash based with the LBA field used using the bits 4-5 of the LBA field (LBA=37 decimal=1_00_101 binary) which are 10 binary or 2 decimal. As there are four entries 722, the value can be modulo 4, which results in 2. Therefore entry 2 722 is accessed in inner node 1 and the corresponding node pointer is followed to inner node 2 706. The header node of inner node 2 can indicate that bits 2-5 of LBA field (1_0010_1 binary) are used to index into the inner node 2 706. As there are four entries 722, the index can be modulo 4 (1001 binary is 9 decimal) the resulting entry 722 at index 1 can be accessed and followed to leaf node 708.

When the translation system accesses the leaf node 708, the header can indicate a search using the LBA offset (LBA=1001_01_ binary). As the request indicates an LBA offset=1 and four entries, 1 modulo 4 is one. Entry 732 can be accessed to determine if it is a match. As entry 732 is not a match and a collision, the sorted storage area 728 can be searched. As the requested insert does not have a match in the sorted storage area 728, the translation system can perform the insert between entries 738 and 740 followed by an update of original entry 732 in the hashed storage area. The result of the insert can be seen in FIG. 7B.

Due to the insert performed in FIG. 7B, the leaf node 708 in is full. As a result, the leaf node can be split into two nodes 708 and 756 as seen in FIG. 7C to allow for further future inserts.

After determining the leaf node 708 is full, the translation system can create two additional nodes. A new inner node 748 can receive the pointer from parent inner node 2 706. The new node can be created with a head that identifies that LBA offsets of 0 or 1 are located in leaf node 708 and LBA offsets of 2 or 3 are located in leaf node 756. Entries 730, 732, 738 and 746 can be reordered in leaf node 708. Entries 734, 736, 742 and 746 can be copied to leaf node 756 and ordered.

Figure 8A:
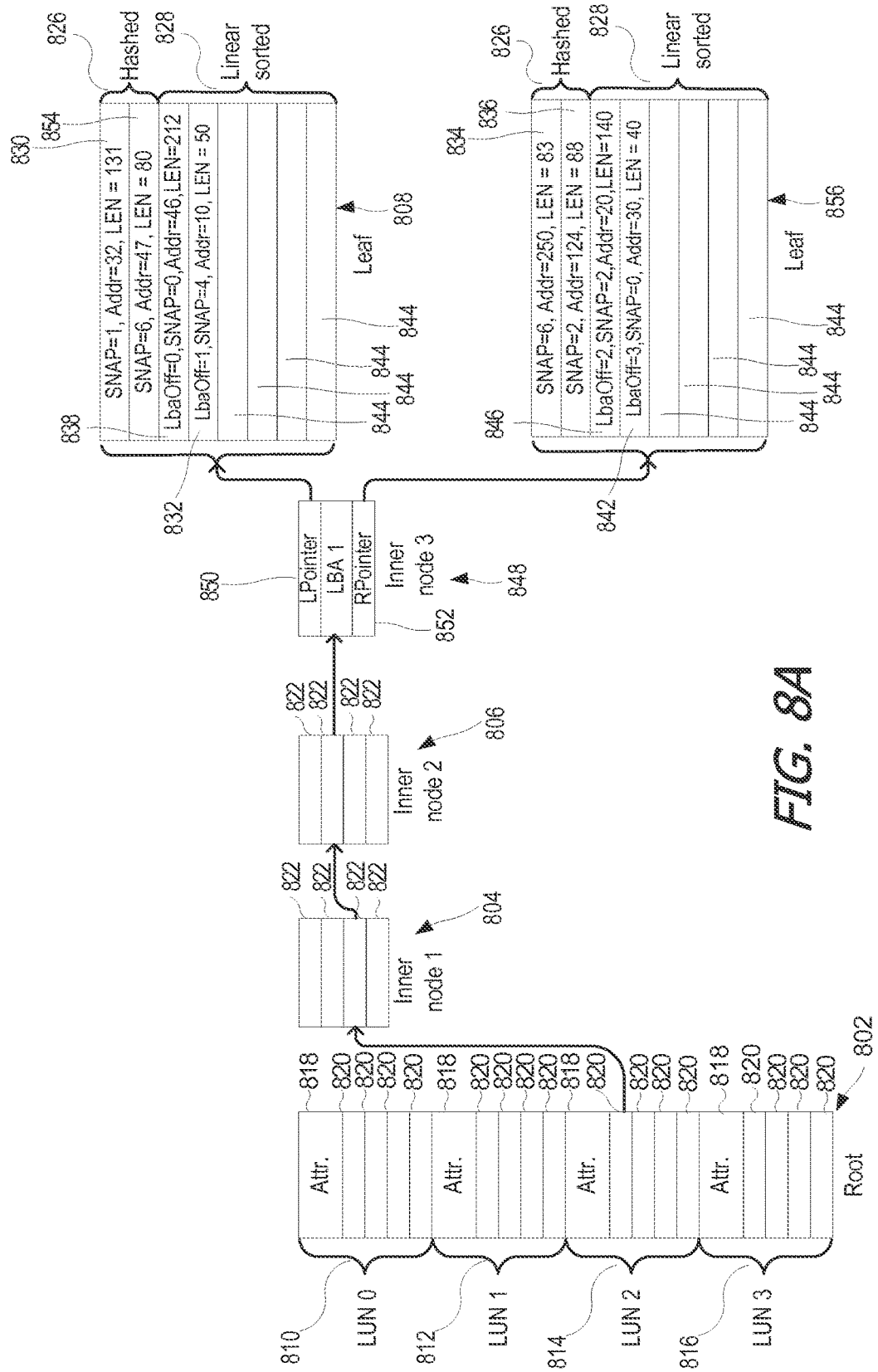
FIG. 8A shows a diagram of a map for translating storage requests into physical addresses in accordance with at least one embodiment.
Figure 8B:
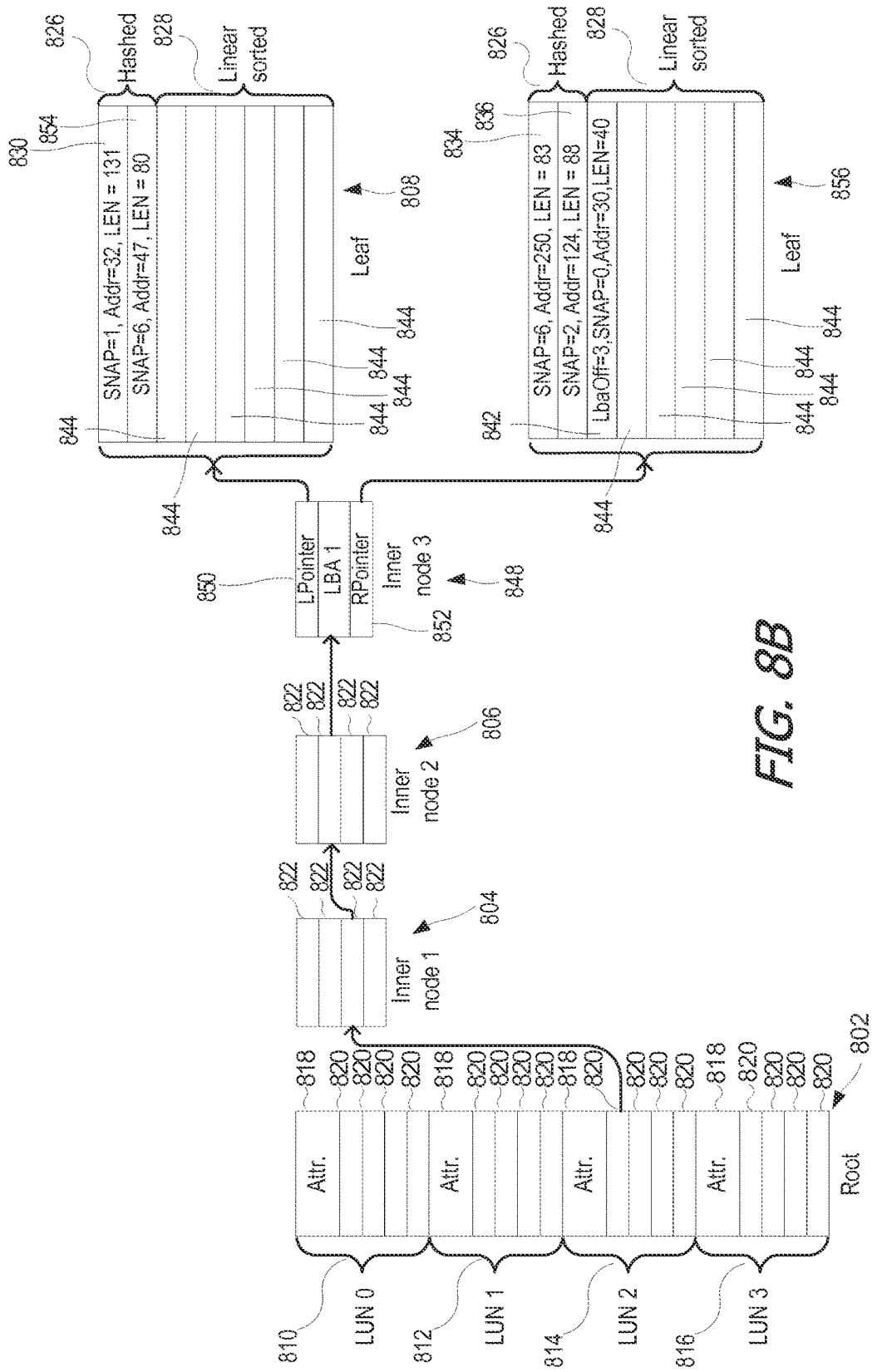
FIG. 8B shows a diagram of a map for translating storage requests into physical addresses after three deletions in accordance with at least one embodiment.
Figure 8C:
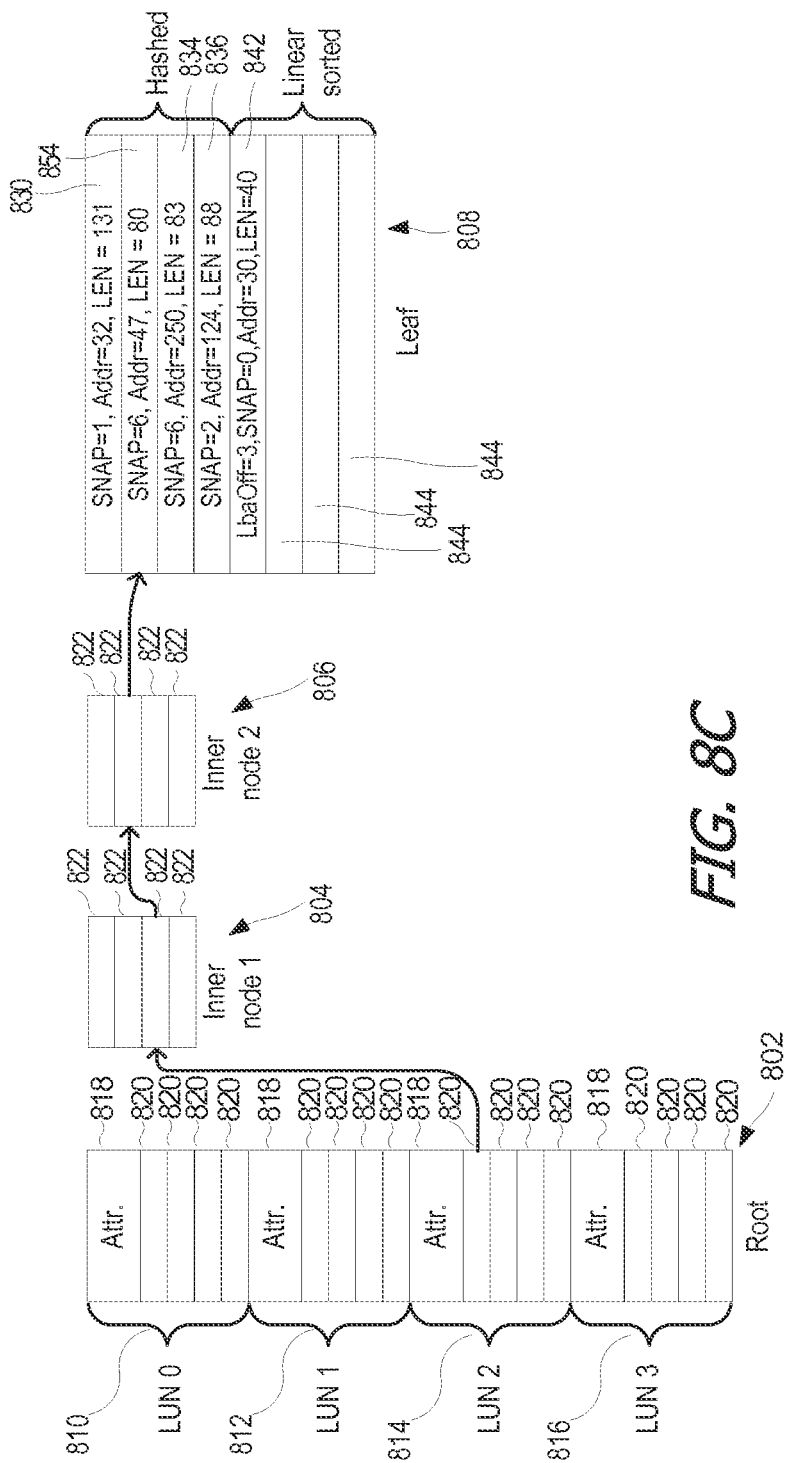
FIG. 8C shows a diagram of a map for translating storage requests into physical addresses after three deletions and a merge in accordance with at least one embodiment.

An delete operation can act as a search operation to determine the correct node for the delete operation and then an delete an entry when the node is reached. If the entry exists and the node hosting the deleted entry does not fall below an entry threshold as a result of the delete, the entry can be emptied and no further action is necessary. However, if a delete is performed, a node can fall below an entry threshold and require further action. In some cases, the node can be merged with a neighboring node. In other cases, the map may require rebalancing. FIG. 8A shows a diagram of a map for translating storage requests into physical addresses in accordance with at least one embodiment. FIG. 8B shows a diagram of a map for translating storage requests into physical addresses after three deletions in accordance with at least one embodiment. FIG. 8C shows a diagram of a map for translating storage requests into physical addresses after three deletions and a merge in accordance with at least one embodiment.

In FIG. 8A, the map contains a root node 802 with root entries 810, 812, 814 and 816. Root node entry 814 contains attributes 818 and one or more other values 820 that include a pointer to inner node 1 804. Inner node 1 includes inner node entries 822, in which one inner node entry 822 points to inner node 2 806. Inner node 2 also contains inner node entries 822, one of which contains a pointer to inner node 3 848. Inner node 3 848 contains inner node entries 850 and 852 that point to leaf nodes 808 and 842. Leaf nodes 808 and 842 contain a hashed storage area 826 and linear sorted storage area 828. In the storage areas 826 of node 808, entries 830, 832, 838 and 846 exist. In the storage areas 826 of node 856, entries 834, 836, 842 and 846 exist.

The client can request a Delete(LUN=2, LBA=36, SNAP=0). After receipt of the client request, the translation system can start the search at root node 802. After reading a header of root node 802, the translation system can determine that the root node is a hashed storage area based on LUN number. Using a hash obtained from the root node header, where hash=LUN, the translation system can access the entry for LUN 2 814. Attributes about LUN 2 can be found in an attribute section of entry 814. The translation system can use a node pointer stored in among values to find the next node, inner node 1 804. Upon arrival at inner node 1 804, the translation system can read the header for inner node 1 804. The header can indicate that inner node 1 is also hash based with the LBA field used using the bits 4-5 of the LBA field (LBA=37 decimal=1<u>00</u>100 binary) which are 10 binary or 2 decimal. As there are four entries 822, the value can be modulo 4, which results in 2. Therefore entry 2 822 is accessed in inner node 1 and the corresponding node pointer is followed to inner node 2 806. The header node of inner node 2 can indicate that bits 2-5 of LBA field (<u>1001</u>00 binary) are used to index into the inner node 2 806. As there are four entries 822, the index can be modulo 4 (1001 binary is 9 decimal) the resulting entry 822 at index 1 can be accessed and followed to inner node 3 848. At inner node 3 848, the header can indicate that LBA bit field 1 (1001<u>0</u>0) can be used to determine whether to go to an entry that leads to leaf node 808 (for 0) or an entry that leads to leaf node 856 (for 1). As the value is zero, the pointer for leaf node 808 is followed. The leaf node can indicate that bit 0 of the LB field can be used as an index into the hashed storage area (LBA=10010<u>0</u>). As entry 830 does not match the delete request, the linear sorted area can be examined for the entry which is found at entry 838.

After being found through a search, entry 838 can be deleted from the leaf node 808. In the embodiment shown, entry 846 is copied over 838 and the old entry 846 location is made into an empty entry 844. As a minimum threshold of three entries exist in each leaf node, no further action is required.

With a few more deletions, the client can cause leaf node 808 to fall below a minimum threshold of occupied entries. For example, the client can further request Delete(LUN=2, LBA=38, SNAP=2) which is entry 846 and Delete(LUN=2, LBA=37, SNAP=4) which is entry 832. The result of the deletions can be seen in FIG. 8B. After the deletion of entry 832, the threshold of three entries in a leaf node has been crossed. As a result, the translation system can examine the parent node of leaf 808 (e.g. inner node 3 848) for nodes that can be merged with leaf node 808.

The translation system can determine that node 856 can be merged with node 808 because of a shared significant bit (i.e. bit 1 of LBA) at inner node 3 848 and a combined node would not exceed a full threshold. Entries from node 856 can use insert operations into node 808 using a new bit mask of bits 0-1 of LBA that represent the merged node. Node 856 can then be retired and/or deleted. Further, as inner node 3 848 now has only one child node 808, inner node 3 848 can be replaced by child node 808. Inner node 3 848 can also be retired and/or deleted. The resulting map after three deletions can be seen in FIG. 8C.

Cloning information can be used in conjunction with bitmap information in a node header to indicate which data is in the current branch and which cloned data is from the original cloned information. A clone can be created from a snapshot, but unlike a snapshot, the clone can be further modified. The clone uses a different branch than the snapshot (e.g., LUN), but the clone retains links to the old information through the use of bitmaps in nodes that indicate which information is overwritten and which information is original from the other branch. When traversing the map of a clone, a bitmap can indicate that an original branch, from which the clone was made, should be traversed instead to find the information. Thus, a bitmap can cause the search to begin again from the root node using new parameters for the search that differ from the request provided by the client (e.g. searching the clone's originating LUN).

Figure 9:
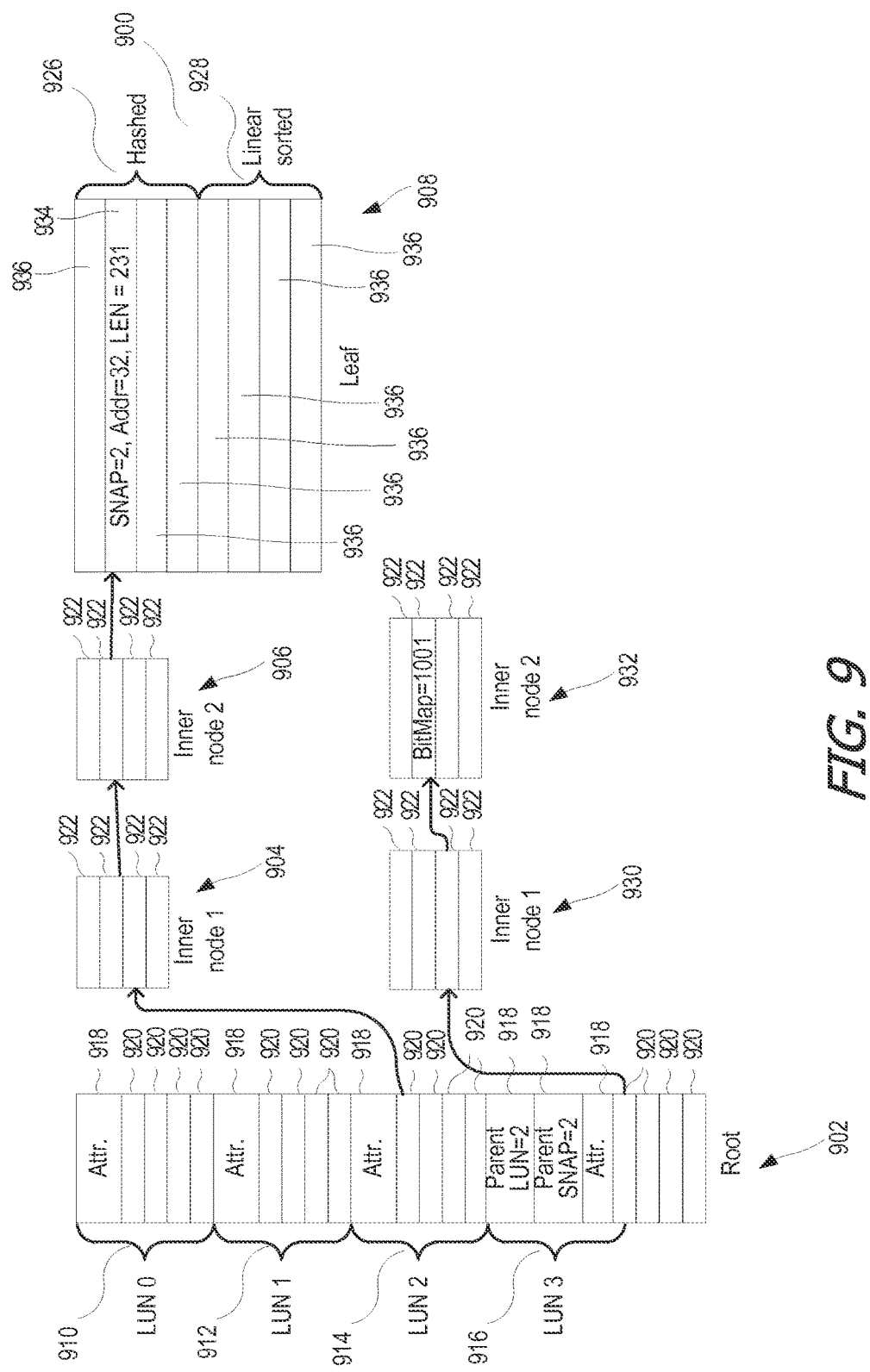
FIG. 9 shows a diagram of a map for translating storage requests into physical addresses using cloning information in accordance with at least one embodiment.

FIG. 9 shows a diagram of a map for translating storage requests into physical addresses using cloning information. For example, a branch including nodes 930 and 932 in LUN 3 was cloned from LUN 2. A bitmap in node 932 indicates with a value of "1001" that a first and last entry in a leaf node were overwritten, but that the second and third nodes are still original data from the cloned information. When the bitmap is encountered by the translation system, the translation system can return to the root node using the clone LUN and determine the parent LUN and SNAP. The translation system can then use the parent LUN and SNAP in place of the clone information to track down the original information that was not overwritten by the clone.

In the example shown, a Search(LUN=3, LBA=37, SNAP=0) is requested by a client. The translation system determines a hash function from the header of the root node 902, which indicates that the hash function=LUN. The entry of LUN 3 916 is accessed and the pointer in value 920 is followed to inner node 930. Upon arrival at inner node 930, the translation system can read the header for inner node 930. The header can indicate that inner node 930 is also hash based with the hash based on bits 4-5 of the LBA field (LBA=37 decimal=1<u>00</u>101 binary) which are 10 binary or 2 decimal. As there are four entries 922, the value can be modulo 4, which results in 2. Therefore entry 2 922 is accessed in inner node 1 and the corresponding node pointer is followed to inner node 932. The header node of inner node 2 can indicate that bits 2-5 of LBA field (100101 binary) are used to index into the inner node 2 932. As there are four entries 922, the index can be modulo 4 (1001 binary is 9 decimal) the resulting index 1 can be used to access entry 1 922, which contains a bitmap value. When the bitmap is compared against the remaing two digits of the LBA field (10001), the 0 at place 1 (1001) indicates that the clone data is unchanged from the original snapshot.

As the clone data is unchanged, the translation system can return to the root node and examine the original entry 916 for a clone snapshot basis. The translation system can read the entry attributes 918 of entry 916 to determine that the parent LUN=2 and the parent SNAP=2. The original Search (LUN=3, LBA=37, SNAP=0) has the same result as Search (LUN=2, LBA=37, SNAP=2). The translation system can then traverse the map using the new search parameters.

Using the parent parameters to form the Search(LUN=3, LBA=37, SNAP=0), the translation system can search down the parent branch of the map for the physical address and/or attributes. The translation system determines a hash function from the header of the root node 902, which indicates that the hash function=LUN. The entry of LUN 2 914 is accessed and the pointer in value 920 is followed to inner node 904. Upon arrival at inner node 904, the translation system can read the header for inner node 904. The header can indicate that inner node 904 is also hash based with the hash based on bits 4-5 of the LBA field (LBA=37 decimal=100101 binary) which are 10 binary or 2 decimal. As there are four entries 922, the value can be modulo 4, which results in 2. Therefore entry 2 922 is accessed in inner node 904 and the corresponding node pointer is followed to inner node 906. The header node of inner node 906 can indicate that bits 2-5 of LBA field (100101 binary) are used to index into the inner node 906. As there are four entries 922, the index can be modulo 4 (1001 binary is 9 decimal) the resulting index 1 can be used to access entry 1 922, which points to leaf node 908.

When the translation system accesses the leaf node 908, the header can indicate a search using the LBA offset (LBA=100101 binary). As the request indicates an LBA offset=1 and four entries, 1 modulo 4 is one. Entry 926 can be accessed to determine if it is a match, which it is. The value in entry 926 of address 32 and length 231 can be used to access physical memory.

Figure 10:
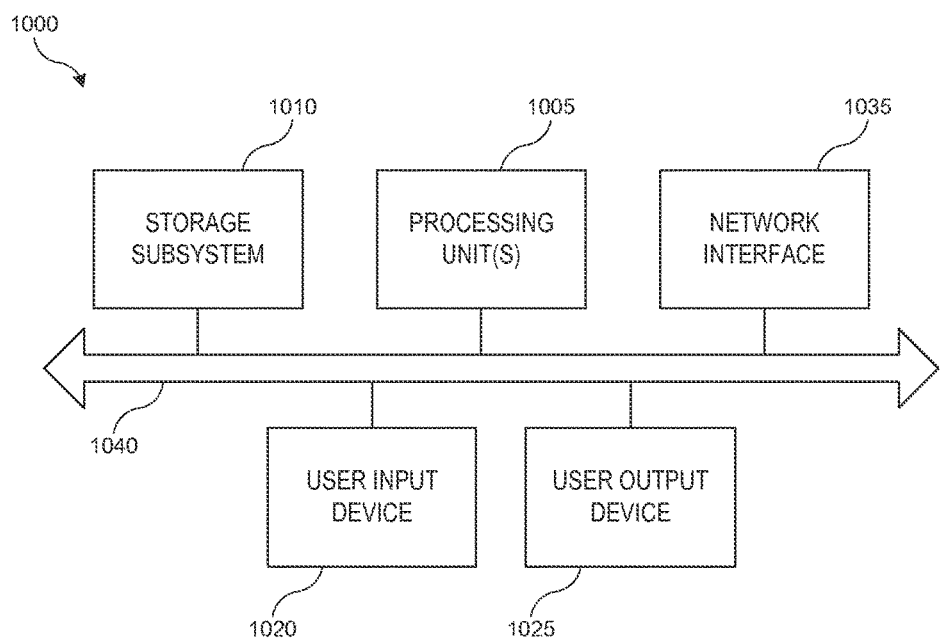
FIG. 10 illustrates an example of a computing system in which one or more embodiments may be implemented.

Various operations described herein can be implemented on computer systems, which can be of generally conventional design. FIG. 10 is a simplified block diagram illustrating a representative computer system 1000. In various embodiments, computer system 1000 or similar systems can implement a client 206 (e.g., any of systems 114, 116) or a server (e.g., management system 204, storage hardware 202).

Computer system 1000 can include processing unit(s) 1005, storage subsystem 1010, input devices 1020, output devices 1025, network interface 1035, and bus 1040.

Processing unit(s) 1005 can include a single processor, which can have one or more cores, or multiple processors. In some embodiments, processing unit(s) 1005 can include a general-purpose primary processor as well as one or more special-purpose co-processors such as graphics processors, digital signal processors, or the like. In some embodiments, some or all processing units 1005 can be implemented using customized circuits, such as application specific integrated circuits (ASICs) or field programmable gate arrays (FPGAs). In some embodiments, such integrated circuits execute instructions that are stored on the circuit itself. In other embodiments, processing unit(s) 1005 can execute instructions stored in storage subsystem 1010.

Storage subsystem 1010 can include various memory units such as a system memory, a read-only memory (ROM), and a permanent storage device. The ROM can store static data and instructions that are needed by processing unit(s) 1005 and other modules of electronic device 1000. The permanent storage device can be a read-and-write memory device. This permanent storage device can be a non-volatile memory unit that stores instructions and data even when computer system 1000 is powered down. Some embodiments of the invention can use a mass-storage device (such as a magnetic or optical disk or flash memory) as a permanent storage device. Other embodiments can use a removable storage device (e.g., a floppy disk, a flash drive) as a permanent storage device. The system memory can be a read-and-write memory device or a volatile read-and-write memory, such as dynamic random access memory. The system memory can store some or all of the instructions and data that processing unit(s) 1005 need at runtime.

Storage subsystem 1010 can include any combination of computer readable storage media including semiconductor memory chips of various types (DRAM, SRAM, SDRAM, flash memory, programmable read-only memory) and so on. Magnetic and/or optical disks can also be used. In some embodiments, storage subsystem 110 can include removable storage media that can be readable and/or writeable; examples of such media include compact disc (CD), read-only digital versatile disc (e.g., DVD-ROM, dual-layer DVD-ROM), read-only and recordable Blue-Ray® disks, ultra density optical disks, flash memory cards (e.g., SD cards, mini-SD cards, micro-SD cards, etc.), magnetic "floppy" disks, and so on. The computer readable storage media do not include carrier waves and transitory electronic signals passing wirelessly or over wired connections.

In some embodiments, storage subsystem 1010 can store one or more software programs to be executed by processing unit(s) 1005, such as an operating system, a browser application, a mobile app for accessing an online content management service, a desktop application for accessing the online content management service, and so on. "Software" refers generally to sequences of instructions that, when executed by processing unit(s) 1005 cause computer system 1000 to perform various operations, thus defining one or more specific machine implementations that execute and perform the operations of the software programs. The instructions can be stored as firmware residing in read-only memory and/or applications stored in non-volatile storage media that can be read into volatile working memory for execution by processing unit(s) 1005. Software can be implemented as a single program or a collection of separate programs or program modules that interact as desired. From storage subsystem 1010, processing unit(s) 1005 can retrieve program instructions to execute and data to process in order to execute various operations described herein.

A user interface can be provided by one or more user input devices 1020 and one or more user output devices 1025. Input devices 1020 can include any device via which a user can provide signals to computing system 1000; computing system 1000 can interpret the signals as indicative of particular user requests or information. In various embodiments, input devices 1020 can include any or all of a keyboard, touch pad, touch screen, mouse or other pointing device, scroll wheel, click wheel, dial, button, switch, keypad, microphone, and so on.

User output devices 1025 can include any device via which computer system 1000 can provide information to a user. For example, user output devices 1025 can include a display to display images generated by computing system 1000. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). Some embodiments can include a device such as a touchscreen that function as both input and output device. In some embodiments, other user output devices 1025 can be provided in addition to or instead of a display. Examples include indicator lights, speakers, tactile "display" devices, printers, and so on.

Network interface 1035 can provide voice and/or data communication capability for computer system 1000. In some embodiments, network interface 1035 can include radio frequency (RF) transceiver components for accessing wireless voice and/or data networks (e.g., using cellular telephone technology, advanced data network technology such as 3G, 4G or EDGE, WiFi (IEEE 802.11 family standards), or other mobile communication technologies, or any combination thereof), GPS receiver components, and/or other components. In some embodiments, network interface 1035 can provide wired network connectivity (e.g., Ethernet) in addition to or instead of a wireless interface. Network interface 1035 can be implemented using a combination of hardware (e.g., antennas, modulators/demodulators, encoders/decoders, and other analog and/or digital signal processing circuits) and software components.

Bus 1040 can include various system, peripheral, and chipset buses that communicatively connect the numerous components of computing system 1000. For example, bus 1040 can communicatively couple processing unit(s) 1005 with storage subsystem 1010. Bus 1040 can also connect to input devices 1020 and output devices 1025. Bus 1040 can also couple computing system 1000 to a network through network interface 1035. In this manner, computing system 1000 can be a part of a network of multiple computer systems (e.g., a local area network (LAN), a wide area network (WAN), an intranet, or a network of networks, such as the Internet.

Some embodiments include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter.

Through suitable programming, processing unit(s) 1005 can provide various functionality for computing device 1000. For example, in a mobile computing device, processing unit(s) 1005 can execute an operating system capable of communicating with storage system 100. In a desktop computing device, processing unit(s) 1005 can execute an operating system and a desktop application program that presents an interface to storage system 100; in some embodiments, this interface may be integrated with an interface to a file system maintained by the operating system. In some embodiments, processing unit(s) 1005 can execute an application that provides the ability to retrieve and display data from sources such as storage system 100.

In some embodiments, computer system 1000 or a similar system can also implement operating system 302, translation system 304 or physical storage 306. In such instances, a user interface may be located remotely from processing unit(s) 1005 and/or storage subsystem 1010; similarly, storage subsystem 1010 or portions thereof may be located remotely from processing unit(s) 1005. Accordingly, in some instances, various components of computer system 1000 need not be physically located in any particular proximity to each other.

It will be appreciated that computer system 1000 is illustrative and that variations and modifications are possible. Computer system 1000 can have other capabilities not specifically described here (e.g., router, email reporting, mobile phone, global positioning system (GPS), power management, one or more cameras, various connection ports for connecting external devices or accessories, etc.). Further, while computer system 1000 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

FIGS. 11 to 15 show processes that can be accomplished through the use of system recited herein (e.g. client 302, translation system 304 and physical storage 306 from FIG. 3). The processes include search, update, delete, clone and snapshot. The data structures and processes described can be accomplished with the use of the systems shown in FIG. 3, including client 302, translation system 304 and physical storage 306. The map data structure can be contained in storage located in translation system 304 and/or physical storage 306. The operations described can be performed by the translation system 304 in response to a request provided by client 302.

Figure 11:
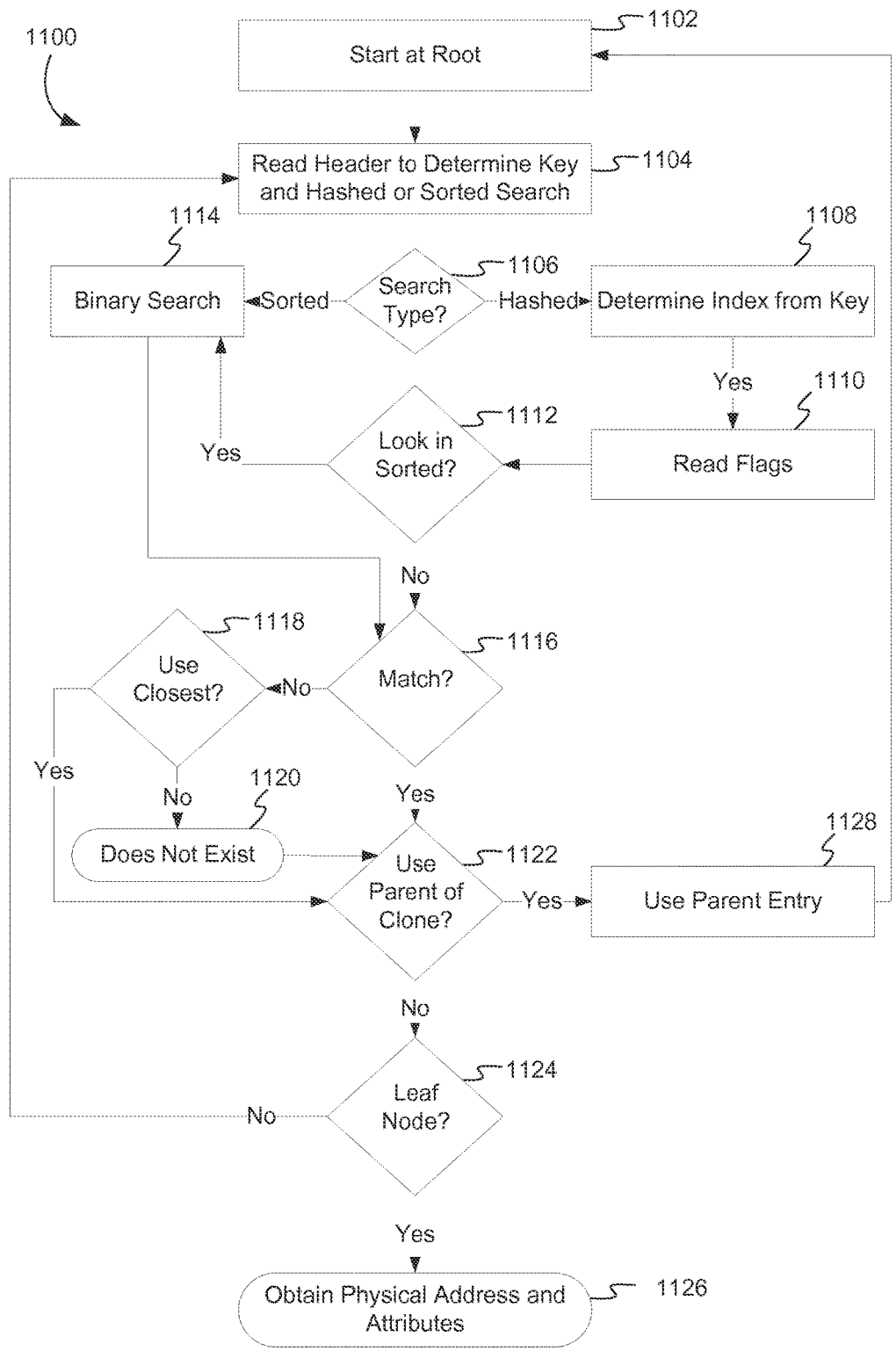
FIG. 11 shows an illustrative example of a process that may be used to search a map for translating a storage request into physical addresses in accordance with at least one embodiment.

FIG. 11 shows an illustrative example of a process 1100 that may be used to search a map for translating a storage request into physical addresses in accordance with at least one embodiment. A translation system can receive a request to retrieve data from a client. The request can include fields that describe a logical placement of the data. In block 1102, the translation system can start a root node. In block 1104, the translation system reads header information from the root node to determine a key (e.g. from one or more of the fields) for searching the node and whether a hashed search or sorted search should be performed. In block 1106, a search type is selected based on the header information. If a sorted search is selected, in block 1114 a search method can be used (e.g., binary search) to find a matching entry with the key in a sorted storage area. In block 1108, if the search selected is a hashed-based search, an index into the hash storage area can be determined and/or computed based on the identified key. An entry can be accessed based on the computed hash. In block 1110, any flags present in the entry can be read (e.g. a bitmap as described above). If the entry is not found in block 1112, a fallback binary search can be performed in block 1114 if needed.

The binary search from 1114 or hash-based search from block 1112 can examine a selected entry to determine if there is a matching entry in block 1116. In block 1118, if no match, a closest neighbor may be used if appropriate (e.g. snapshot). If, in block 1118, the closest neighbor is not appropriate, then in block 1120, the entry does not exist. In some embodiments, if the entry does not exist, the translation system can decide whether to search the parent in block 1122. However, if an entry does match from block 1116 or a closest neighbor is appropriate from block 1118, then the entry can be reviewed in block 1122 to determine if a parent entry of clone should be used (e.g. a bitmap indicated a parent snapshot should be used). In block 1128, if the parent entry should be used then the translation system uses the parent entry and returns to the root node in block 1002. If not, in block 1124, the matched entry does not reside in a leaf node, the pointer in the entry can be followed to the next node where the header is read in block 1104. If in block 1124, the matched entry is a leaf node, then the translation system can obtain physical addresses and attributes from the matched entry in the leaf node. The physical address and attributes can then be used to access a physical storage system to operate on data (e.g. retrieve data).

Figure 12:
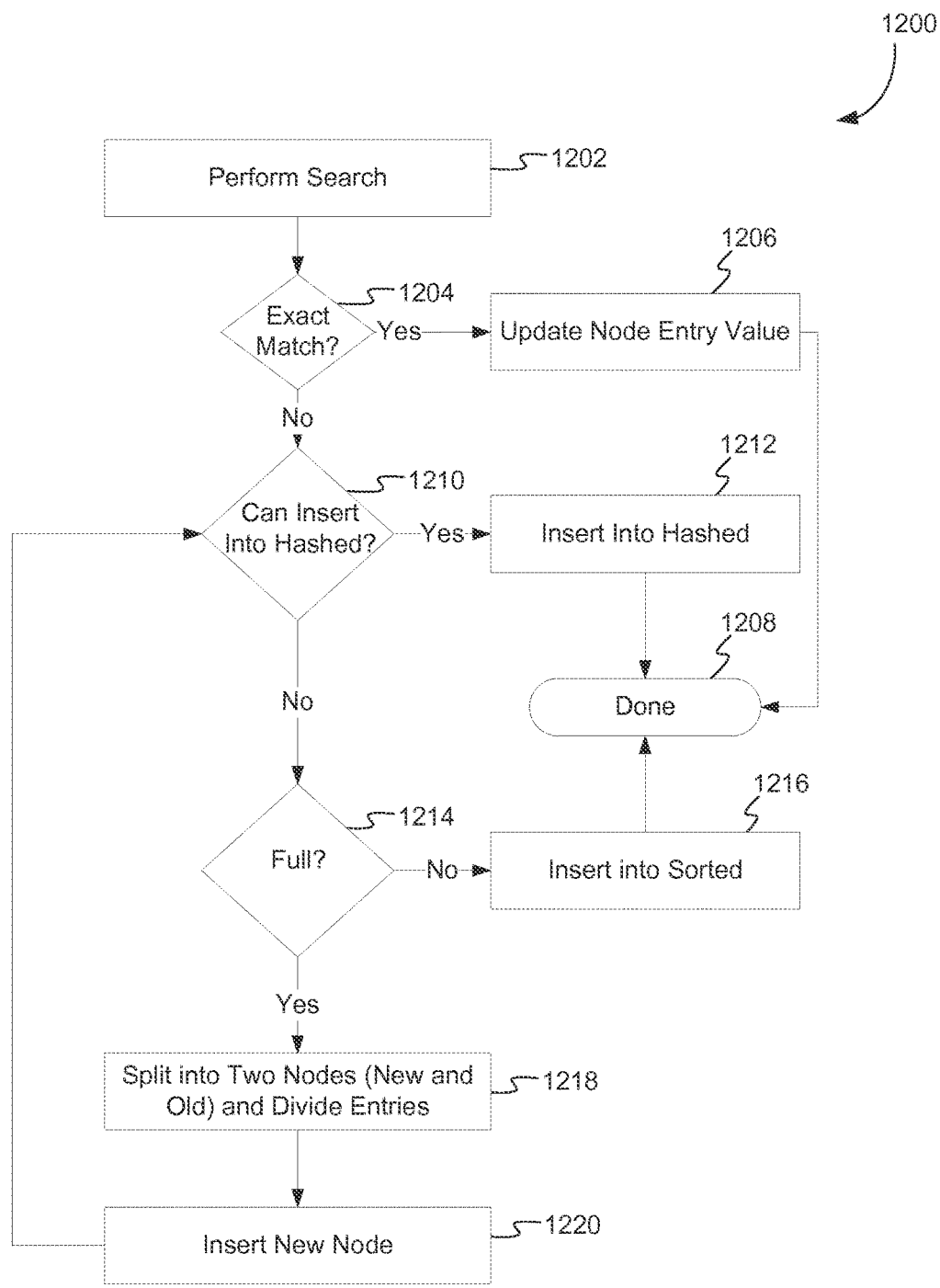
FIG. 12 shows an illustrative example of a process that may be used to update a map for translating a storage request into physical addresses in accordance with at least one embodiment.

An update process can begin with a search for a matching entry, which can be followed by an overwrite or an insert process. If a leaf node becomes full, the leaf node can be split into two nodes. FIG. 12 shows an illustrative example of a process 1200 that may be used to update a map for translating a storage request into physical addresses in accordance with at least one embodiment. In block 1202, a search for the location of an entry can be performed (e.g. search process 1100 from FIG. 11). In block 1204, if an exact match is found, a node entry value can be updated in block 1206 which completes the process in block 1208. However, if in block 1204 a leaf node is reached and there is not an exact match, a determination is made in block 1210 whether there is room to insert the new entry into a hashed storage area of the leaf node. If so, in block 1212, a new entry can be inserted into the hashed storage area of the leaf node which completes the process in block 1208. If the entry cannot be inserted into the hashed storage area, in block 1214, the node can be examined to see if it is full. If the node is not full, in block 1216, the entry can be inserted into the sorted storage area which completes the process in block 1208. If the node is full, in block 1218, the node can be split into two nodes in which the node entries are divided and the header of each node can be updated to accommodate the split (e.g. remove a significant digit of a field or modify the modulus value because of the division of the entries). The old node can receive half of the entries and a newly created node can receive half of the entries. In block 1220, the new node can be attempted to be inserted into the parent node, which moves to block 1210 to attempt the insert.

A delete process can begin with a search for the node to delete. If the node can be deleted without triggering an minimum threshold of entries in a log, the process can stop. However, if the threshold is triggered, a merging of the triggering node and a neighbor can be attempted. If that is not able to work, the map can be rebalanced.

Figure 13:
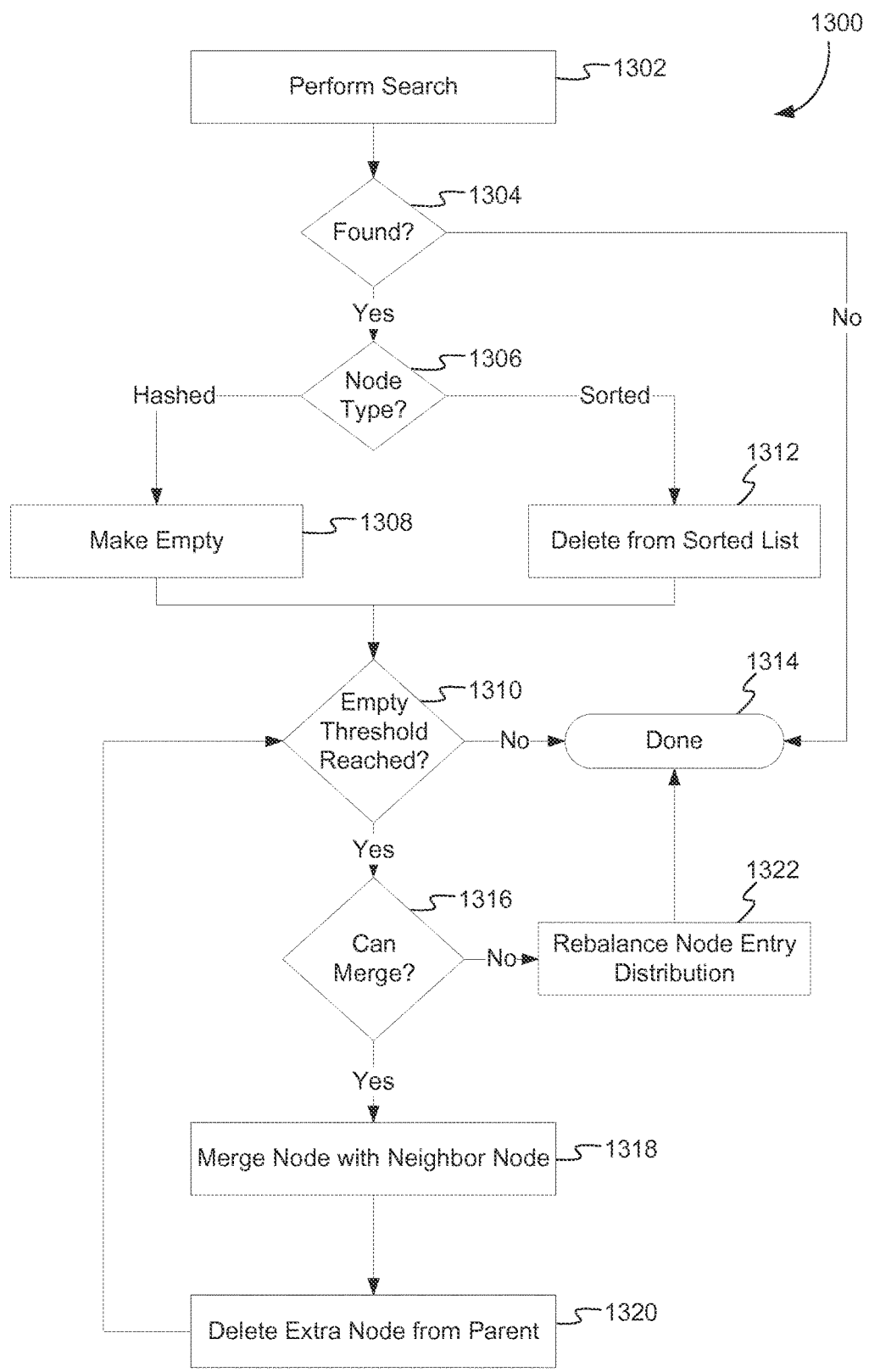
FIG. 13 shows an illustrative example of a process that may be used to delete an entry in a map for translating a storage request into physical addresses in accordance with at least one embodiment.

FIG. 13 shows an illustrative example of a process 1300 that may be used to delete an entry in a map for translating a storage request into physical addresses in accordance with at least one embodiment. In block 1302, a search for the location of an entry can be performed (e.g. search process 1100 from FIG. 11). In block 1304, if an entry is not found, the delete process cannot move forward and is complete in block 1314. In block 1306, if the node entry is found, the node type can be determined. In block 1308 node entries in hashed storage areas can be made empty. In block 1312, node entries in sorted storage areas can be deleted from the sorted list. After the deletion in block 1312 or made empty in block 1308, the node can be examined to see if the node has an insufficient number of node entries such that an empty threshold is reached. If the threshold is not reached, the process can be completed in node 1314. However, if the node has reached an empty threshold, in block 1316 neighboring nodes can be examined to see if a merging of nodes is possible. If merging is not possible, the translation system can cause the node entries to be rebalanced in the map (e.g. using a B-Tree process, etc.) and the deletion can be completed in block 1314. However, if the node can merge with a neighbor node, in block 1318, the node merges entries with the neighbor node to form a node with entries and an empty node. In block 1320, the empty node is deleted from a parent node which can cause a test for an empty threshold of in block 1310.

Figure 14:
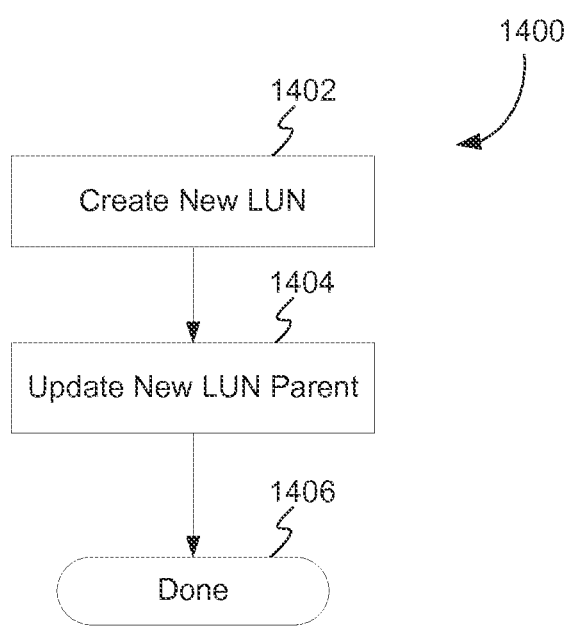
FIG. 14 shows an illustrative example of a process that may be used to clone a Logical Unit in a map for translating a storage request into physical addresses in accordance with at least one embodiment.
Figure 15:
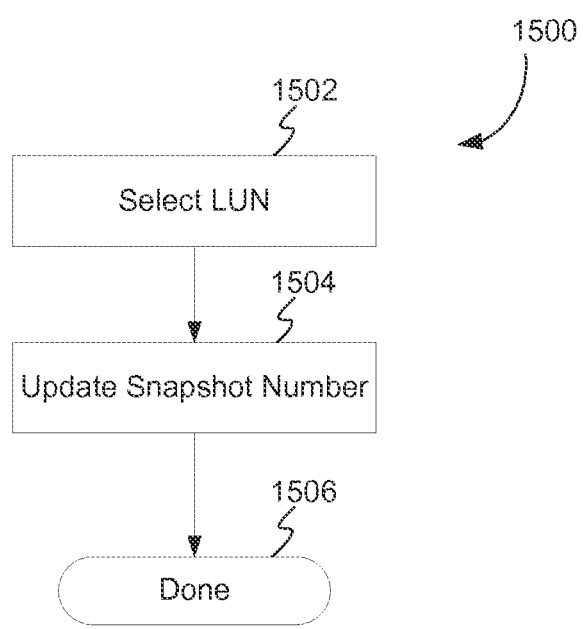
FIG. 15 shows an illustrative example of a process that may be used to snapshot a Logical Unit in a map for translating a storage request into physical addresses in accordance with at least one embodiment.

Creation of a clone and/or snapshot can be a simple process. In some embodiments, copying does not occur, but a number is set in a node attribute. In FIGS. 14 and 15 processes are shown that can create snapshots and clones by changing values rather than copying data. In the embodiments shown, the snapshot and clone can be quickly prepared without a time cost related to size. As the data can remain stationary, a snapshot or clone can be created without data copy overhead.

When a clone is created, a new LUN is created to hold new data for the snapshot. However, the cloned data remains with the old LUN as part of a snapshot. As the old data remains in its current position, retrieving the original clone data can be accomplished by processes and systems described in connection with FIG. 9. FIG. 14 shows an illustrative example of a 1400 process that may be used to clone a Logical Unit (LUN) in a map for translating a storage request into physical addresses in accordance with at least one embodiment. In block 1402, the translation system can create a new LUN for the clone. In block 1404, the new LUN node can be updated with parent information of the clone (e.g. parent LUN and parent SNAP can be stored as attributes in a LUN entry), after which the process can be completed in block 1406.

When a snapshot is created, a current snapshot number is incremented. In some embodiments, this number is located in an attribute entry of a node representing a LUN. FIG. 15 shows an illustrative example of a process 1500 that may be used to snapshot a Logical Unit (LUN) in a map for translating a storage request into physical addresses in accordance with at least one embodiment. In block 1502, a target LUN node can be found (e.g. through search) and selected. In some embodiments, the LUN entry is part of a root node and is configured to store these extra attributes. In block 1504, a snapshot number attribute is increased in the selected LUN node entry which completes the process at block 1506.

It should be recognized that in some figures only necessary portions of a diagram, such as a map, may be shown. It should also be recognized that example fields and orders of fields have been given, but that other orders and fields may be used. Processes can also be accomplished in other orderings and/or operations of processes can be performed in parallel.

While examples have been simplified and examples have been given in terms of a block device, it should be recognized that the processes can be used with other storage types (e.g. file system storage, object storage, database storage, structured storage, etc.).

What is claimed is:

1. A computer implemented method comprising:
receiving a request to access a logical location in a storage system, the request including a set of fields describing the logical location in the storage system;
accessing a map describing the storage system, the map comprising a plurality of nodes, at least some of the plurality of nodes each comprising a hashed storage portion comprising hashed entries and a sorted storage portion comprising sorted entries;
determining a first portion of the set of fields to use as a first key based on metadata included in a header of a first node of the plurality of nodes;
locating a first entry in the hashed storage portion or the sorted storage portion of the first node based on the first key;
determining that the first entry includes a link to a second node of the plurality of nodes;
determining a second portion of the set of fields to use as a second key based on metadata included in a header of the second node;
locating a second entry in the second node based on the second key;
determining that the second entry includes information indicating a physical address of a storage device;
retrieving data stored at the physical address of the storage device; and
returning the data in response to the request.

2. The computer implemented method of claim 1, wherein locating the second entry further comprises locating a closest entry by selecting the closest entry having a closest key that is not greater than the second key.

3. The computer implemented method of claim 2, wherein the closest entry represents the entry that has not changed since a last snapshot.

4. The computer implemented method of claim 1, wherein locating the first entry further comprises locating the first entry by selecting the first entry from the hashed storage portion of the first node based at least in part on the first portion of the set of fields as an index to the hashed storage portion of the first node.

5. The computer implemented method of claim 1, wherein locating the first entry further comprises locating the first entry by performing a search in the sorted storage portion of the first node based at least in part on the first portion of the set of fields as an index to the sorted storage portion of the first node.

6. The computer implemented method of claim 1, wherein the set of fields describing the logical location in the storage system comprises at least one of a field indicating a storage node, a field indicating a logical unit number, a field indicating a snapshot number, a field indicating a clone number, and a field indicating a logical block address.

7. The computer implemented method of claim 1, wherein the metadata included in the header of the first node further comprises at least one of a field key that indicates a field that is used as the first key, a field mask indicating one or more bits used in matching the first key or determining an index, a bitmap indicating data for retrieving from a previous clone, and at least one attribute indicating one or more values stored in the hashed storage portion or the sorted storage portion.

8. The computer implemented method of claim 1, wherein the metadata includes information indicating one or more bits of a field corresponding to a logical block address, the field corresponding to the logical block address being included in the request to access the logical location in the storage system.

9. The computer implemented method of claim 8, wherein determining the second portion of the set of fields to use as the second key to locate the second entry in the second node further comprises:
determining second one or more bits of the field indicating the logical block address based on metadata included in a header of the second node, the second one or more bits being different than the one or more bits.

10. A computer implemented method comprising:
receiving a request to perform an operation on a logical location in a storage system, the request including a set of fields;
determining a first portion of the set of fields to use as a first key to a first entry in a first node of a map based on metadata included in a header of the first node;
locating the first entry in the first node based on the first key;
determining that the first entry links to a second node in the map;
determining a second portion of the set of fields to use as a second key to a second entry in the second node;
locating the second entry in the second node based on the second key;
determining the second entry indicates a physical address; and
performing the requested operation based on the physical address.

11. The computer implemented method of claim 10, wherein performing the requested operation further comprises:
incrementing a current snapshot number such that new save operations will not overwrite a current snapshot.

12. The computer implemented method of claim 10, wherein performing the requested operation further comprises:
creating a clone from a snapshot by:
creating a new logical storage device node for the clone; and
storing a parent reference to the snapshot in the new logical storage device node.

13. The computer implemented method of claim 10, wherein locating the first entry in the first node further comprises calculating an index to the first entry in a hashed storage area in the first node, the index based at least in part on one or more of the set of fields.

14. The computer implemented method of claim 10, wherein locating the first entry in the first node further comprises searching for the first key in a sorted storage area in the first node.

15. The computer implemented method of claim 14, wherein searching for the first key in the sorted storage area in the first node further comprises:
determining the first key does not exist; and
selecting a nearest prior entry as the entry.

16. The computer implemented method of claim 10, wherein locating the first entry in the first node further comprises:
determining whether to use a hashed storage area or a sorted storage area in the first node;
when determined to use the hashed storage area, calculating an index to the first entry in the hashed storage area in the first node, the index based at least in part on one or more of the set of fields; and when determined to use the sorted storage area, searching for the first key in the sorted storage area in the first node.

17. The computer implemented method of claim 10, wherein the set of fields comprises two or more fields describing a location in a logical storage container.

18. A computer system, comprising:
one or more computing resources having one or more processors and memory including executable instructions that, when executed by the one or more processors, cause the one or more processors to implement at least:
a storage system;
a translation system configured to form a translation of a set of fields to a physical location of the storage system by:
accessing a map comprising a plurality of nodes, at least some of the plurality of nodes each comprising a hashed storage portion comprising hashed entries and a sorted storage portion comprising sorted entries;
determining a first portion of the set of fields to use as a first key based on metadata included in a header of a first node of the plurality of nodes;
locating a first entry in a hashed storage portion or a sorted storage portion of the first node based on the first key;
determining that the first entry links to a second node;
determining a second portion of the set of fields to use as a second key based on metadata included in a header of the second node;
locating the second entry in the second node based on the second key;
determining the second entry indicates a physical location; and
providing the physical location as at least a part of the translation to the physical location of the storage system.

19. The computer system of claim 18, wherein the translation is from a storage request that translates a file system storage request, block storage request, object storage request, database storage request or structured storage request into a physical location result.

20. The computer system of claim 19, wherein the physical location comprises a physical address and at least one attribute.

21. The computer system of claim 18, wherein at least a first portion of the storage system is physically hosted by a set of computing resources that host the translation system.

22. The computer system of claim 18, wherein at least a first portion of the storage system is physically hosted external to a set of computing resources that host the translation system.

23. The computer system of claim 18, wherein the storage system is vertically integrated with the translation system.

24. A non-transitory computer-readable storage media having stored thereon executable instructions that, when executed by one or more processors of a computer system, cause the computer system to:
receive a request to perform an operation on a logical location in a storage device, the request including a set of fields;
determining a first portion of the set of fields to use as a first key to first entry in a first node of a map based on metadata included in a header of the first node;
locating the first entry in the first node based on the first key;
determining that the first entry links to a second node in the map;
determining a second portion of the set of fields to use as a second key in the second node;
locating the second entry in the second node based on the second key;
the second entry indicates a physical address; and
performing the operation based on the physical address.

25. The non-transitory computer-readable storage media of claim 24, wherein the operation is selected from search, update or delete.

26. The non-transitory computer-readable storage media of claim 24, wherein the instructions further comprise instructions that, when executed, cause the computer system to at least provide redundant array of independent disks services, compression services, deduplication services, snapshots services or file system layer services to the logical storage device.

* * * * *